US012305748B2

(12) United States Patent
Irato et al.

(10) Patent No.: US 12,305,748 B2
(45) Date of Patent: May 20, 2025

(54) TWO SPEED AUTOMATIC TRANSMISSION WITH A FRICTION AND DYNAMICALLY CONTROLLABLE ONE WAY CLUTCH FOR POWER SHIFTING IN AN ELECTRIC VEHICLE

(71) Applicant: DANA GRAZIANO S.R.L., Turin (IT)

(72) Inventors: Fabio Filippo Irato, Turin (IT); Alessio Anzaldi, Vinovo (IT); Harish Mathiazhagan, Canton, MI (US)

(73) Assignee: DANA GRAZIANO S.R.L., Rivoli (IT)

( * ) Notice: Subject to any disclaimer, the term of this patent is extended or adjusted under 35 U.S.C. 154(b) by 0 days.

(21) Appl. No.: 18/345,320

(22) Filed: Jun. 30, 2023

(65) Prior Publication Data

US 2024/0068560 A1 Feb. 29, 2024

Related U.S. Application Data

(60) Provisional application No. 63/367,585, filed on Jul. 1, 2022.

(51) Int. Cl.
*F16H 61/04* (2006.01)
*F16H 3/089* (2006.01)
(Continued)

(52) U.S. Cl.
CPC ............ *F16H 61/04* (2013.01); *F16H 3/12* (2013.01); *F16H 61/30* (2013.01); *F16H 61/32* (2013.01); *F16H 2003/0811* (2013.01); *F16H 3/089* (2013.01); *F16H 3/091* (2013.01); *F16H 3/093* (2013.01); *F16H 48/00* (2013.01); *F16H 2061/044* (2013.01); *F16H 2061/2823* (2013.01); *F16H 2061/2853* (2013.01); *F16H 2200/0034* (2013.01)

(58) Field of Classification Search
CPC .......... F16H 61/04; F16H 61/30; F16H 61/32; F16H 3/091; F16H 2003/0811; F16H 2061/044; F16H 2061/2823; F16H 2200/0034; F16H 48/00–2048/426
See application file for complete search history.

(56) References Cited

U.S. PATENT DOCUMENTS 4,449,424 A * 5/1984 Hauser .................... F16H 3/089
74/606 R
5,722,291 A * 3/1998 Fraley .................... F16H 3/089
74/331

(Continued)

FOREIGN PATENT DOCUMENTS

DE 102013102161 A1 * 9/2014 ............... B60K 1/02
DE 102019114139 B3 6/2020

(Continued)

*Primary Examiner* — Tinh Dang
(74) *Attorney, Agent, or Firm* — McCoy Russell LLP

(57) ABSTRACT

A transmission system for a vehicle, comprising a dynamic controllable clutch (DCC) and a friction clutch. The transmission system may further comprise a controller comprising instructions stored in non-transitory memory that are executable by the controller to adjust a state of the DCC and a state of the friction clutch to selectively engage a first gear ratio and a second gear ratio for providing torque transfer from an input to an output of the transmission system.

19 Claims, 7 Drawing Sheets

(51) Int. Cl.
  *F16H 3/12*   (2006.01)
  *F16H 61/22*  (2006.01)
  *F16H 61/28*  (2006.01)
  *F16H 61/30*  (2006.01)
  *F16H 61/32*  (2006.01)
  F16H 3/08     (2006.01)
  F16H 3/091    (2006.01)
  F16H 3/093    (2006.01)
  F16H 48/00    (2012.01)

(56) References Cited

U.S. PATENT DOCUMENTS

| | | | |
|---|---|---|---|
| 8,051,959 B2 * | 11/2011 | Eisengruber | F16D 41/125 |
| | | | 192/43.1 |
| 8,286,772 B2 | 10/2012 | Eisengruber | |
| 9,188,174 B2 | 11/2015 | Beiser et al. | |
| 10,591,000 B2 | 3/2020 | Voelker et al. | |
| 11,286,996 B2 | 3/2022 | Pawley et al. | |
| 2014/0033844 A1 * | 2/2014 | Rothvoss | F16H 3/089 |
| | | | 74/335 |
| 2014/0080648 A1 * | 3/2014 | Kimes | B60K 6/365 |
| | | | 475/5 |
| 2014/0100071 A1 * | 4/2014 | Kimes | B60L 15/2054 |
| | | | 475/5 |

FOREIGN PATENT DOCUMENTS

| | | | | |
|---|---|---|---|---|
| EP | 2305501 B1 | 1/2012 | | |
| JP | 58149448 A | * | 9/1983 | F16H 61/04 |
| WO | WO-2014139744 A1 | * | 9/2014 | B60K 1/00 |

* cited by examiner

TWO SPEED AUTOMATIC TRANSMISSION WITH A FRICTION AND DYNAMICALLY CONTROLLABLE ONE WAY CLUTCH FOR POWER SHIFTING IN AN ELECTRIC VEHICLE

CROSS REFERENCE TO RELATED APPLICATION

The present application claims priority to U.S. Provisional Application No. 63/367,585, entitled "TWO SPEED AUTOMATIC TRANSMISSION WITH A FRICTION AND DYNAMICALLY CONTROLLABLE ONE WAY CLUTCH FOR POWER SHIFTING IN AN ELECTRIC VEHICLE", and filed on Jul. 1, 2022. The entire contents of the above-listed application are hereby incorporated by reference for all purposes.

TECHNICAL FIELD

The present description relates generally to a transmission using a friction clutch and a dynamic one-way clutch to reduce clutch drag and decrease the required precision of the clutch controller when power shifting.

BACKGROUND AND SUMMARY

Two speed automatic transmissions for electric vehicles are used to increase the gradeability while still meeting the top speed and 0-60 mph targets with smaller electric motors.

In order to perform the shifting between the two speeds without loss of output torque, commonly known as power-shifting, friction type clutches are used. Friction clutches can be used to transfer torque for just one speed or both speeds using either one or two friction clutches, respectively.

If two friction clutches are used, powershifting is possible for both an upshifting and downshifting direction. Using two friction clutches however has the disadvantage of the disengaged clutch drag causing inefficiencies.

In other attempts to reduce clutch drag, rather than using two friction clutches, many transmissions instead use a friction clutch for only one gear ratio, typically for a gear with smaller ratio (e.g., second gear), thereby allowing for powershifting in only one direction (e.g., upshifting). That is, only one friction clutch is used, rather than two friction clutches. Although power shifting capability can only be available in the upshifting direction in such configurations, many of the vehicle requirements can still be met due to the nature of the electric motors which produce peak torque starting from zero speed unlike internal combustion (IC) engines.

In such attempts that use one friction clutch rather than two friction clutches, one of the friction clutches may be replaced with a claw clutch to reduce clutch drag. That is, the transmission may comprise one friction clutch and one claw clutch, as opposed to two friction clutches. Alternatively, one of the friction clutches may be replaced with a claw clutch and a one-way clutch. That is, the transmission may comprise one friction clutch, one claw clutch, and one one-way clutch, as opposed to two friction clutches.

The inventors have recognized potential issues with both of these approaches to reduce clutch drag, however. For example, in order to use the claw clutch to replace one of the friction clutches, high precision controls are required to perform smooth shifting. Without high precision controls, unwanted noise vibration and harshness (NVH) may occur, as well as degradation to and/or misalignment of components. In examples using the claw clutch and the one-way clutch to replace one of the friction clutches, the claw clutch may be used in parallel with the one-way clutch to simplify control of the shifting. However, in approaches where the one-way clutch is used in parallel with the claw clutch, the one-way clutch may not be able to fully disengage. Additionally, the arrangement of the claw and one-way clutch to replace one of the friction clutches may present packing challenges and lead to a higher cost system, at least in part due to the requirement of additional components, increased complexity of assembly, and increased manufacturing time, for example.

The inventors have thus developed an approach to at least partially address the above issues. In one example, the issues described above may be addressed by a transmission system for a vehicle comprising two gear sets, a dynamic controllable clutch (DCC), and a friction clutch. The transmission system developed by the inventors may further include a controller comprising instructions stored in non-transitory memory that are executable to adjust a state of the DCC and a state of the friction clutch to selectively engage a first gear ratio and a second gear ratio of the two gear sets to provide torque transfer from an input shaft to an output shaft of the transmission system.

In this way, clutch drag inefficiencies may be reduced in a compact manner without the need for high precision controls.

In one or more examples, the transmission utilizes a two speed automatic transmission system and it is noted that the DCC is a selectable one-way clutch. Therefore, it is noted that the DCC may also be referred to herein as the selectable one-way clutch. The two gear pairs may constantly be in mesh contributing to two gear ratios. The two gear ratios are acted on by the input of the transmission mechanically coupled to an electric machine acting as the prime mover to output of the transmission connected to the driven wheels of the vehicle.

The proposed solution involves the use of a friction coupling device and a DCC to achieve shifting between the two available gears. Additionally, the DCC may have three discrete modes, one of which allows for full disengagement of the output of the clutch with a gear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
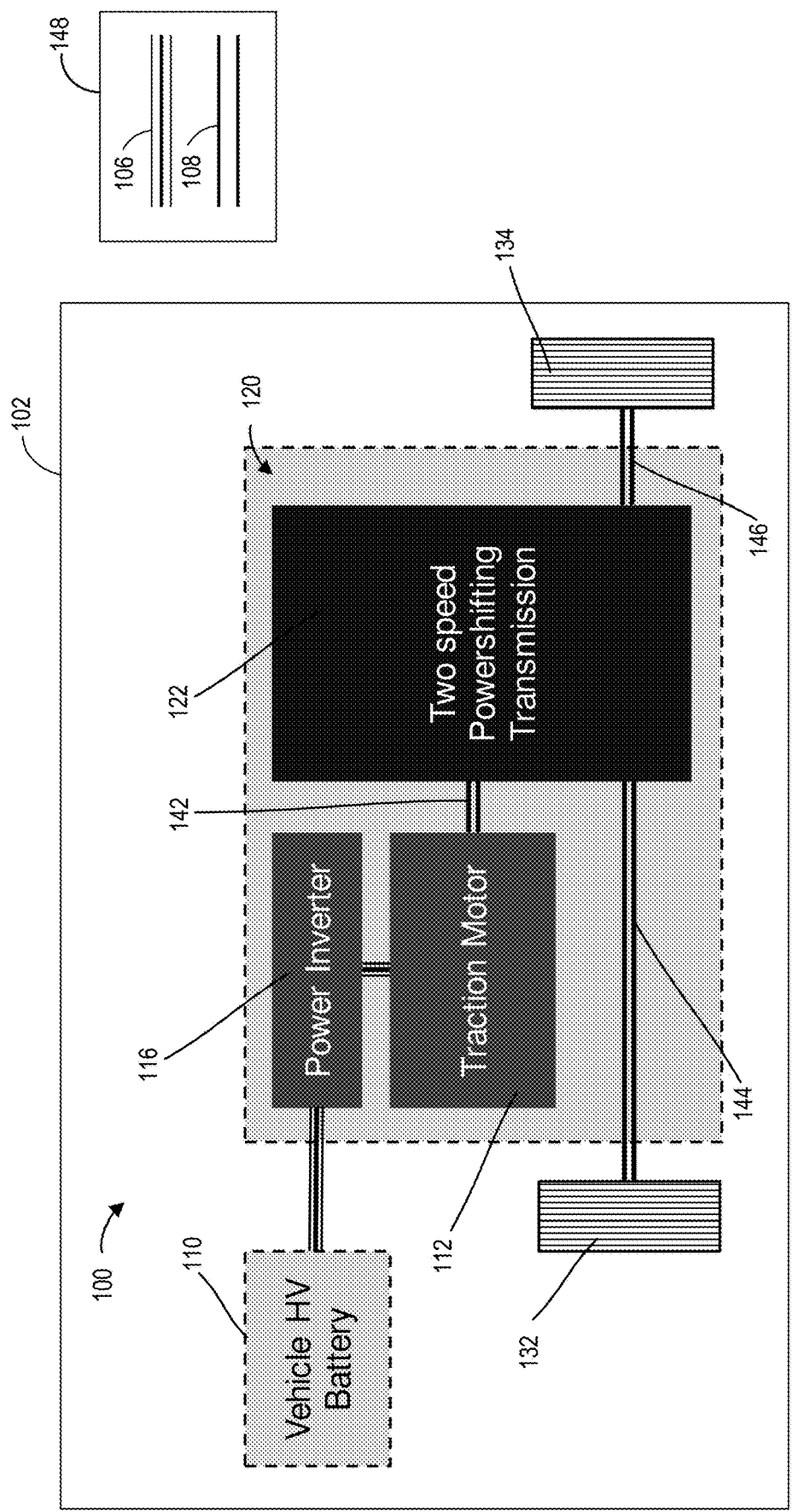
FIG. 1 shows a schematic of a transmission portion of a driveline system.
Figure 2:
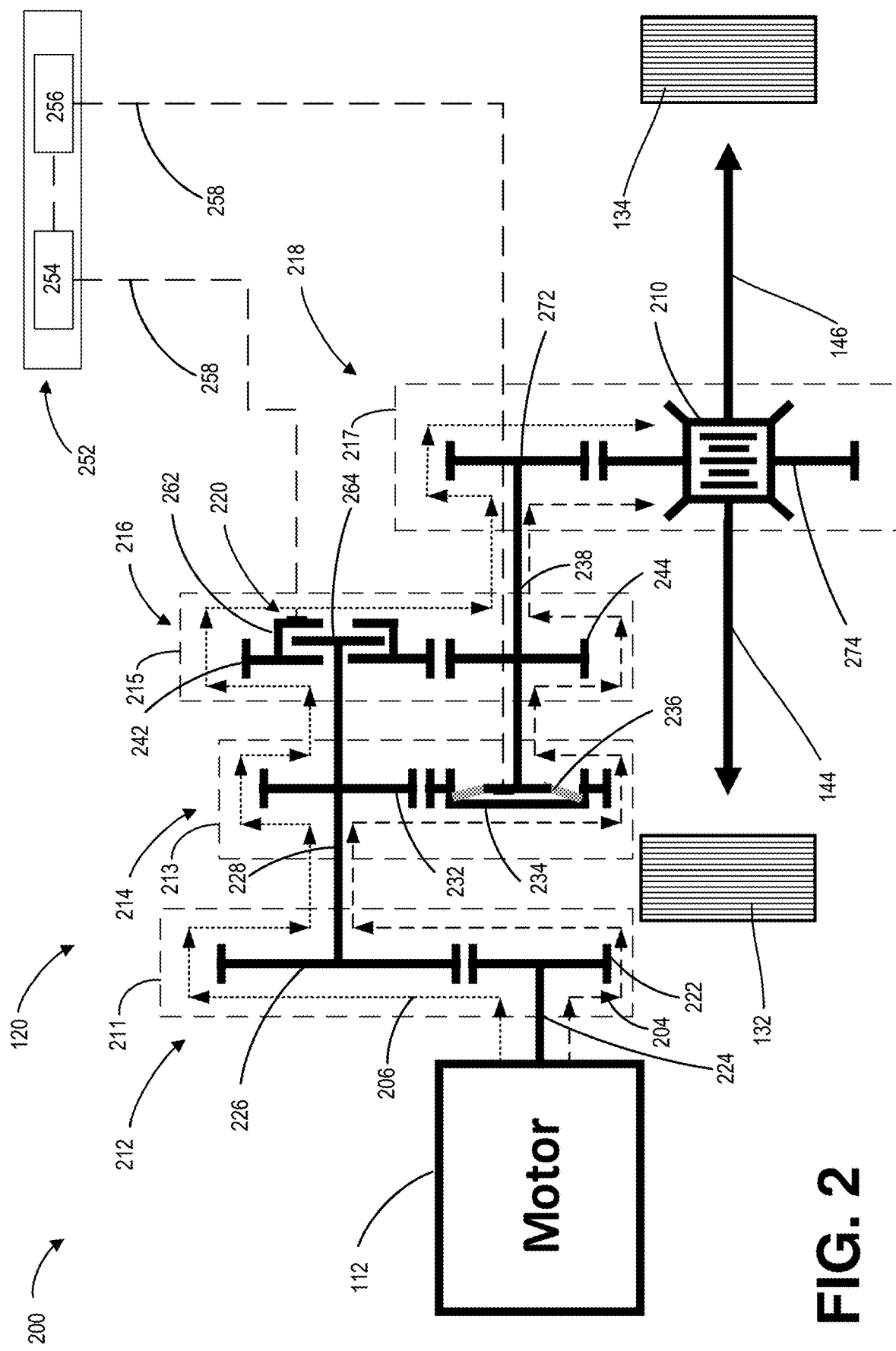
FIG. 2 shows a schematic of the transmission, an axle the transmission acts upon, and the motor with torque flows that act upon the transmission.
Figure 6:
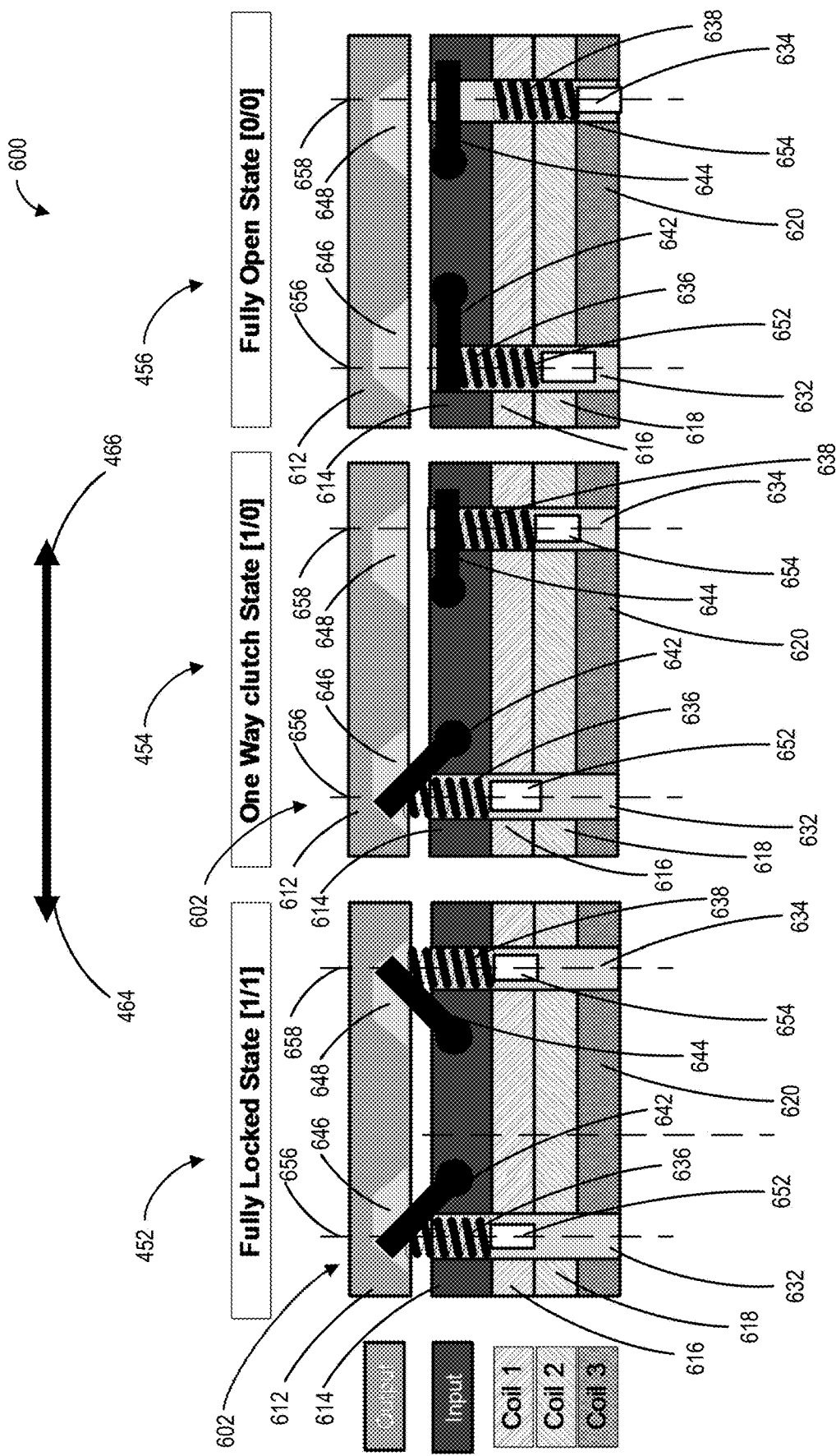
FIG. 6 shows a schematic of the engagement of components of the DCC in different modes.

The following description relates to a transmission, such as the automatic transmission shown in FIG. 1. The transmission may be at least a two speed transmission and may incorporate at least two reduction sets, as shown in FIG. 2. Each reduction set may drivingly couple at least two shafts. The reduction sets may be gear sets. Each reduction set may be of a ratio of a different effective distance, such that each reduction set may produce different rotational speed and torque outputs for the transmission. Each of the reduction sets may selectively couple to at least one shaft via a clutch, and there may be at least two clutches, one for each reduction set. Such selective coupling may be carried out via one or more of hydraulic actuation and electromechanical actuation, as illustrated at FIG. 6. As shown in FIG. 2, at least one of the clutches may be a selectable one-way clutch, such as a dynamically controllable one way coupling device also known as a dynamically controllable clutch (DCC), and at least one of the clutches may be a friction clutch. It is noted that in some examples there may be exactly one DCC and exactly one friction clutch. In this way, the technical effect of reducing clutch drag inefficiencies in a compact manner without the need for high precision controls may be achieved. The DCC, such as the example DCC shown at FIGS. 3, 4A, and 4B, may be used to increase the speed of rotation, rotation per minute (RPM), of an output element up to the same speed as a rotating element that is an input element. As a dynamic clutch, the DCC clutch may absorb the change of kinetic energy of the non-rotating element. The rotating element may be an input element and the stationary element may be an output element. As has been noted herein, the DCC is a selectable one-way clutch and thus may also be referred to as such herein.

Figure 4A:
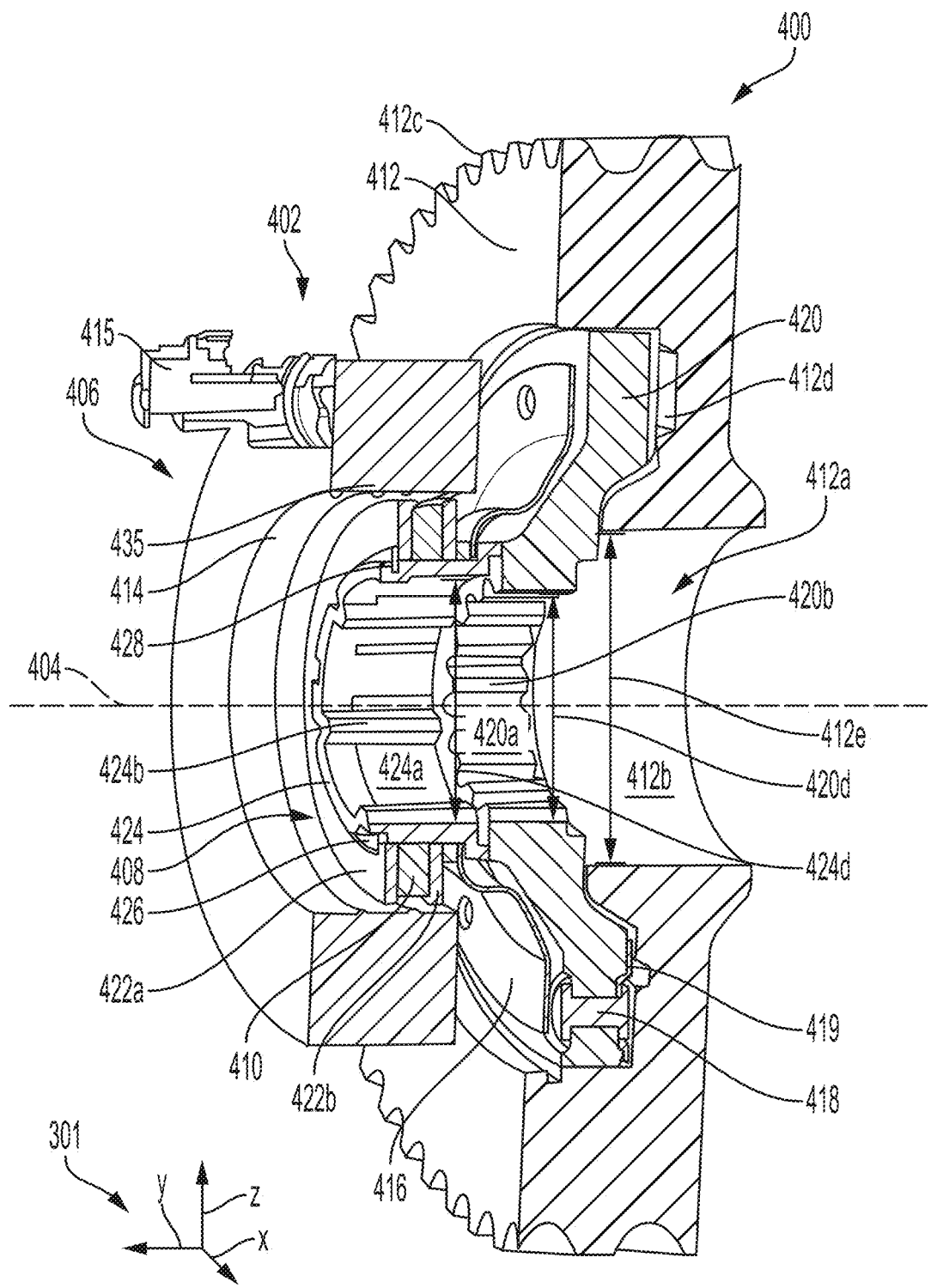
FIG. 4A shows a cutaway perspective view of a DCC and corresponding components, according to one or more examples of the present disclosure.
Figure 4B:
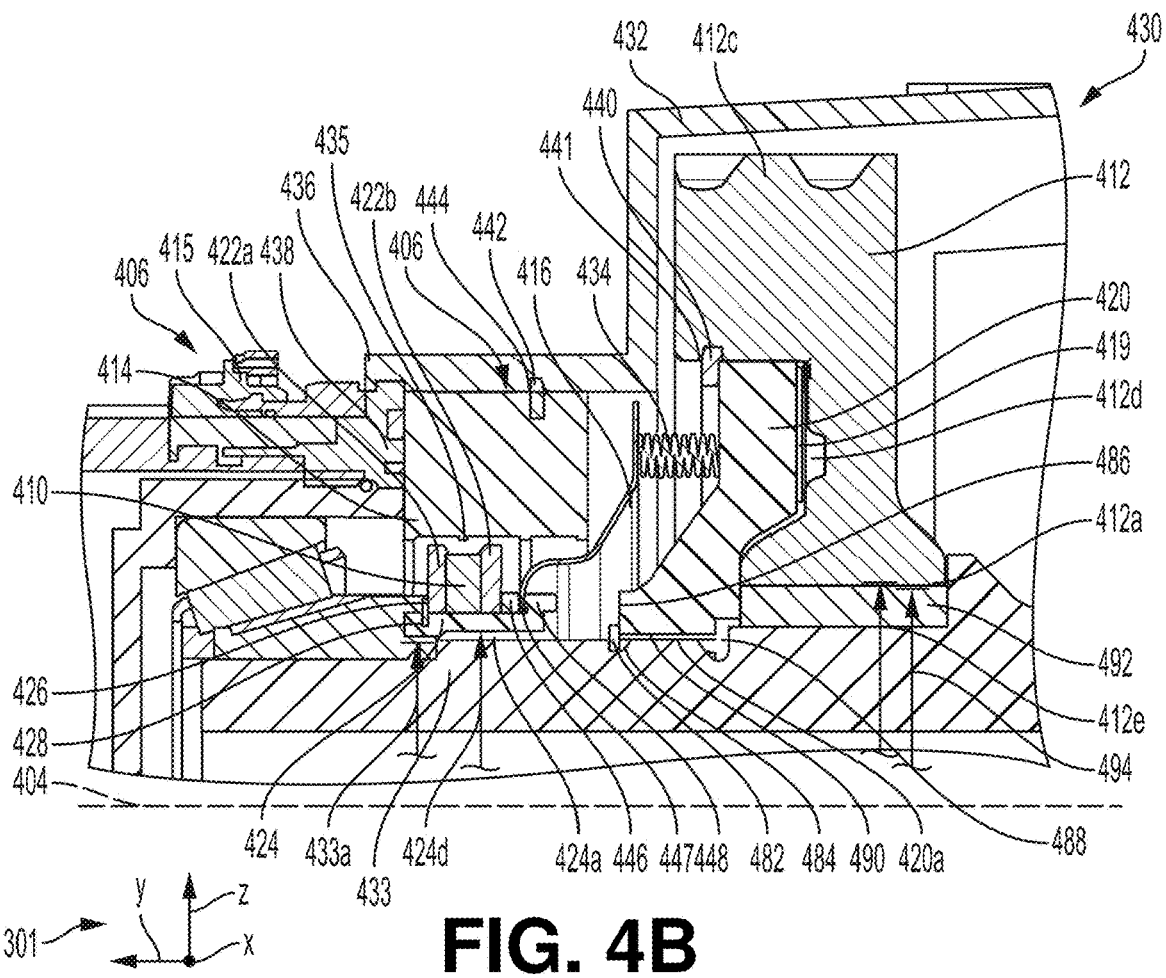
FIG. 4B shows a cross-sectional view of the DCC assembled and coupled to the transmission.
Figure 4C:
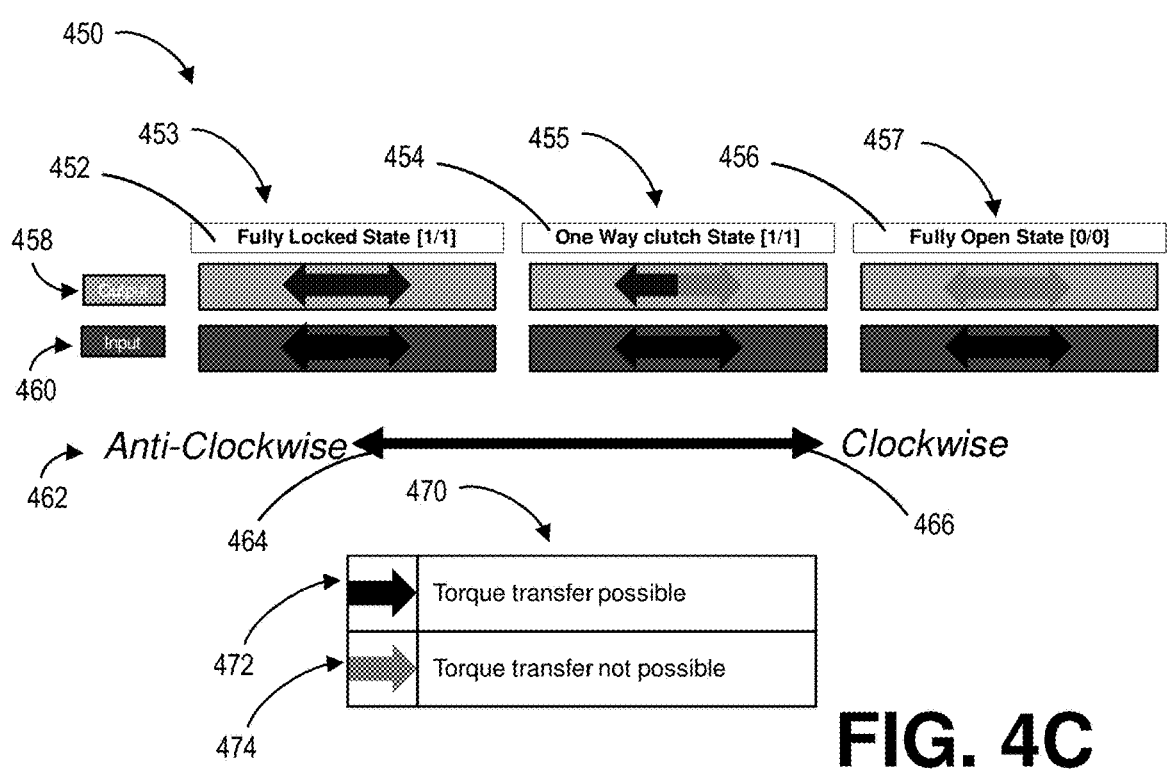
FIG. 4C shows a table of different modes of the DCC.

The DCC may have a plurality of locking modes. Further, as shown in FIGS. 4C and 6, the DCC may be operable in a plurality of discrete states and may be controlled using electromechanical means. These discrete states may be incorporated into modes to allow for torque transfer from the input to the output, or for complete disengagement. The discrete states may include a fully locked state, a one-way clutch (OWC) state, and a fully open state.

The DCC may work in conjunction with a second clutch, such as a friction clutch, to shift between reduction sets. As one example, responsive to a first condition, the vehicle may be operated using the first reduction set with the DCC engaged to transfer torque from an input of the transmission to an output of the transmission. The DCC may be operated in a first discrete state during the first conditions, while the friction clutch may be disengaged during the first condition. The second clutch may be used to engage with another reduction set, such as a second reduction set. Responsive to a second condition, the vehicle may be operated to switch from using the first reduction set to using the second reduction set. In order to switch from using the first reduction set to using the second reduction set, the friction clutch may be gradually applied while disengaging the DCC. After completing the transfer from the first reduction set to the second reduction set, the DCC may then be completely disengaged. That is, the friction clutch may be gradually applied to gradually increase the torque transfer through the friction clutch while the selectable one-way clutch is disengaged in a controlled manner. During this process the torque is transferred from the transmission input to the output throughout the duration of the transition, where the transmission input and output may be in the form of an input shaft and an output shaft, for example. The engagement of the selectable one-way clutch and friction clutch may be coordinated via plurality of microcontrollers. In this way, the technical effect of reducing clutch drag inefficiencies in a compact manner is achieved without the need for high precision controls.

Figure 3:
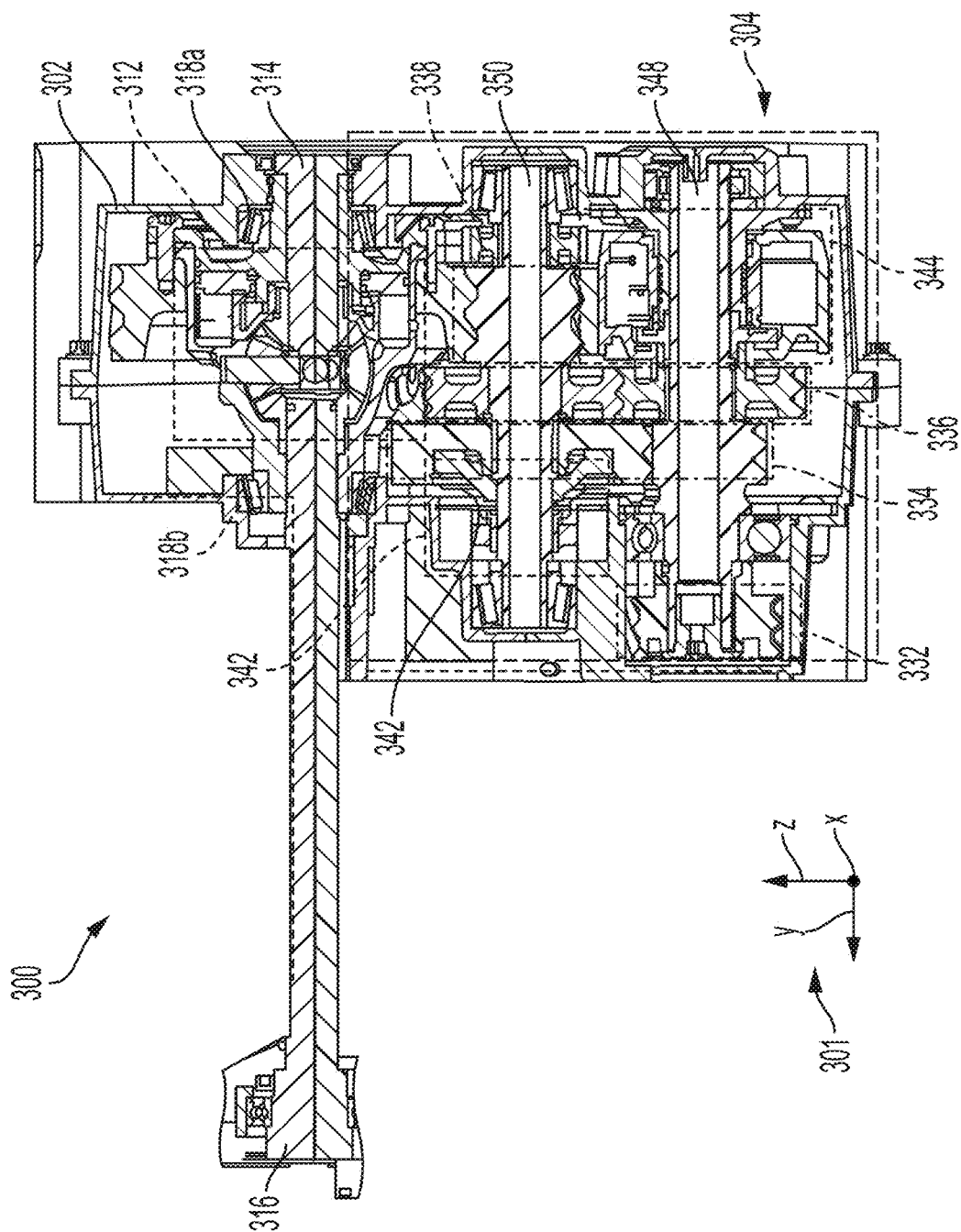
FIG. 3 shows a partial cross-sectional view of the transmission and components of the transmission.
Figure 5:
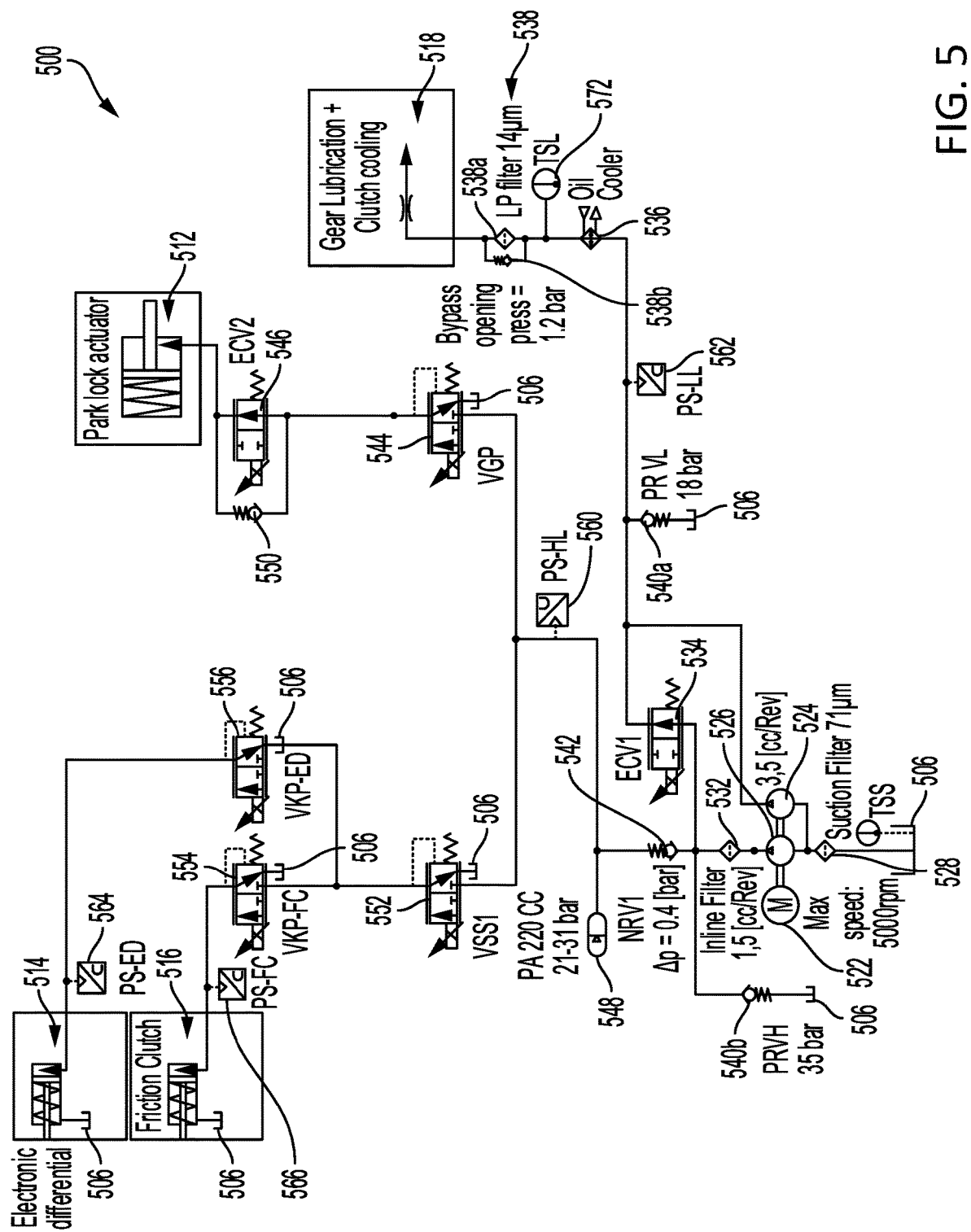
FIG. 5 shows a schematic of a fluid hydraulic circuit used to control and affect components of the transmission.

As may further be seen, FIG. 1 shows a schematic of a transmission portion of a driveline system including the components, such as the battery, power inverter, and electric machine, that acts upon the transmission. The vehicle of FIG. 1 may be a hybrid or an EV powered vehicle with an electric machine. The transmission of the vehicle may incorporate a differential. FIG. 2 shows a schematic of the components of a transmission of FIG. 1, as well as the inputs and the outputs to the transmission. The transmission may be a two speed transmission with at least two reduction sets of different ratios that output different rotational speeds and torques. At least one of the reduction sets may be drivingly coupled via a frictional clutch and one of the reduction sets may be drivingly coupled via a one-way clutch. FIG. 2 shows a plurality of controllers are shown in the schematic of FIG. 2 that may control a friction clutch and one-way clutch used select reduction sets and shift speeds. FIG. 3 shows a cross section of an embodiment of the transmission and the components of the transmission from a side view. The transmission of FIG. 3 may be an embodiment of the transmission of FIG. 2. FIG. 4A shows an exploded view of a one-way dynamic clutch when sectioned and the components of a one-way dynamic clutch. FIG. 4B shows a cross-sectional view of the one-way dynamic clutch when assembled and coupled to the transmission of FIG. 3. FIG. 4C shows a table of different modes of the dynamic clutch when locked, one-way clutch (OWC), and open. The one-way dynamic clutch of FIG. 4A-C may be used as the one-way clutch in the schematic of FIG. 2. FIG. 5 shows a schematic of a fluid hydraulic circuit used to control and affect components of the transmission. FIG. 6 shows a schematic of the engagement of components of the dynamic controllable clutch in different modes between the input and output of the clutch. FIG. 6 shows how a first locking element and a second locking element may be adjusted during a locked mode, a one-way clutch (OWC) mode, and an open mode of FIG. 4C.

FIGS. 3-4B are shown approximately to scale, though other relative dimensions may be used.

FIGS. 3-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 1, an example schematic of a power system 100 for a vehicle 102 is shown. As illustrated, the power system 100 may comprise a battery 110, a power inverter 116, an electric machine 112, and a transmission system 120. As illustrated at key 148, electrical interfaces 106 between components of the power system 100 are represented by a thicker line between two thinner lines that are parallel to the thicker line. Torsional interfaces 108 between components of the power system 100 are represented a two parallel lines. It is noted that the transmission system 120 may comprise a transmission 122 and components drivingly coupled to the transmission 122.

The battery 110 is an energy storage device and may supply components of the power system 100 with energy in the form of electrical energy. In one or more examples, the battery 110 may be a high voltage (HV) battery. The battery 110 is electrically coupled to the electric machine 112 via the power inverter 116.

The power inverter 116 may convert direct current (DC) from the battery 110 into alternating current (AC) for the electric machine 112. Energy from the battery 110, the power and rotation of the electric machine 112, and conditions such as the frequency of the alternating current in the power inverter 116, may be regulated by a controller. For example, the controller may receive data from a plurality of sensors as inputs and provide outputs to alter the conditions of the battery 110, electric machine 112, power inverter 116, and transmission system 120. Further details as to the controller are provided herein below.

The electricity delivered from the battery 110 to the electric machine 112 may be used to drive the electric machine 112. In one or more examples, the electric machine 112 may act as the prime mover generating mechanical power for the transmission 122 of the power system 100. The electric machine 112 may be a motor, such as a traction motor, for example. The electric machine 112 may also act as a generator and generate electrical energy to be stored in the battery 110 of the power system 100, in one or more examples.

The electric machine 112 may distribute torque via a motor torque output 142 to the transmission 122. The motor torque output 142 may be a torsional interface. The transmission 122 may distribute mechanical energy of the transmission 122 to the first wheel 132 via a first torque output 144 and to a second wheel 134 via a second torque output 146. The torques distributed via the first torque output 144 and via the second torque output 146 may be approximately similar in examples where the vehicle 102 is moving linearly. The torques distributed by first torque output 144 and second torque output 146 may be different in examples where the vehicle 102 is moving in a turn. In this way, the transmission system 120 distributes mechanical energy from the electric machine 112 to drive the first wheel 132 and the second wheel 134 to propel the vehicle 102 in a direction. It is noted that the first torque output 144 and the second torque output 146 are shafts, in one or more examples. Therefore, the first torque output 144 and the second torque output 146 are also referred to as shafts herein.

Continuing with the transmission system 120, the transmission system 120 may comprise the transmission 122, as well as other components, such as a transmission control unit (TCU), a hydraulic shifting system, an electronic pump, and a differential. The differential may be an electronic limited slip differential (eLSD). The transmission 122 may increase the torque or speed provided by the electric machine 112 to the first wheel 132 and second wheel 134. The transmission 122 may further distribute mechanical energy to the first wheel 132 and the second wheel 134 via a differential. The differential may be incorporated into the transmission 122. Alternatively, the differential may be separate from but drivingly coupled to the transmission 122. The hydraulic shifting system may use an actuator, such as a hydraulic piston, that is hydraulically driven to shift gear sets or other reduction sets of the transmission 122. The TCU of the transmission 122 may change settings of the transmission system 120 based on internal conditions of the transmission system 120 recorded by a plurality of sensor and or commands from the operator or user of vehicle 102. The TCU of the transmission 122 may communicate with the controller to receive commands from the operator or user of the vehicle 102 and/or change settings in components outside of the transmission system 120 such as the electric machine 112.

Turning to FIG. 2, a schematic of a transmission motor system 200 is shown part of a vehicle 102. As shown at FIG. 2, the transmission motor system 200 may comprise the electric machine 112, the transmission system 120, the first wheel 132, and the second wheel 134.

The electric machine 112 provides the transmission 122 with rotational energy via torque. Rotational energy may be transferred through the transmission 122 via a first torque flow 204 and a second torque flow 206. The first torque flow 204 and the second torque flow 206 may be distributed to first torque output 144 and wheel 132, and the second torque output 146 and second wheel 134 by a differential 210. Differential 210 may be incorporated as a component of the transmission 122. Differential 210 may be electronic differential, such as an eLSD. The differential 210 may be drivingly coupled to the first wheel 132 via the first torque output 144 and to the second wheel 134 via the second torque output 146.

The transmission 122 forms a plurality of reduction sets including a first reduction set 211 with a first reduction ratio 212, a second reduction set 213 with a first gear ratio 214, a third reduction set 215 with a second gear ratio 216, and a fourth reduction set 217 final drive ratio 218, wherein each reduction set is enclosed by a box formed of dashed lines. The first reduction ratio 212 may act as a first reduction set. The first gear ratio 214 may act as a second reduction set. The second gear ratio 216 may act as a third reduction set. The final drive ratio 218 may act as a fourth reduction set. The transmission 122 has two clutches in the form of a friction clutch 220 and a DCC 236, where the DCC is a selectable one-way clutch. As the DCC 236 is a selectable one-way clutch, it is noted that the DCC 236 may also be referred to herein as the selectable one-way clutch. The DCC 236 is a part of the first gear ratio 214.

The first reduction 211 set may be supported by and span a first shaft 224 and a second shaft 228. The second reduction set 213 and the third reduction set 215 may span and be supported by the second shaft 228 and a third shaft 238. The fourth reduction set 217 may span and be supported by third shaft 238 and differential 210. The first shaft 224 may be an output drivingly coupled to the electric machine 112. The second shaft 228 may be a clutch shaft. The third shaft 238 may be a final drive shaft. The differential 210 may be drivingly coupled to an axle formed of at least two shafts, including first torque output 144 and second torque output 146. Shaft 144 of the axle may be a first torque output. Shaft 146 of the axle may be may be another output.

The friction clutch 220 may drivingly couple the clutch shaft 228 to the second gear ratio 216. The friction clutch 220 may drivingly couple or be formed from the second gear ratio 216. If not drivingly coupled to the clutch shaft 228, torque may not be transferred to the first gear ratio 214. The selectable one-way clutch 236 may drivingly couple first gear ratio 214 to the final drive shaft 238. If not drivingly coupled to the final drive shaft 238, torque may not be transferred through the first gear ratio 214 to the final drive shaft 238. When the friction clutch 220 drivingly couples the clutch shaft 228, rotational energy and torque of electric machine 112 may follow the second torque flow 206. When the selectable one-way clutch 236 drivingly couples the first gear ratio 214, the rotational energy and torque of electric machine 112 may follow the first torque flow 204.

The engagement of the friction clutch 220 and the selectable one-way clutch 236 may be governed by a control system 252. The control system 252 may be formed a plurality of controllers. For one example the friction clutch 220 may be controlled by and communicatively coupled to a first controller 254. The selectable one-way clutch 236 may be controlled by and communicatively coupled to a second controller 256. Communicative coupling may be represented by dashed lines 258. The first controller 254 and second controller 256 may be microcontrollers. The first controller 254 and second controller 256 may be communicatively coupled such that the friction clutch 220 or the selectable one-way clutch 236 engage and the other clutch disengages.

For example, the first controller 254 may engage the friction clutch 220 to drivingly couple the clutch shaft 228 to second gear ratio 216. The first controller 254 may communicate with the second controller 256 to disengage the selectable one-way clutch 236. The first controller 254 may send a command gradually increase the normal force on the friction clutch 220 to gradually increase the torque transfer through the friction clutch 220. Simultaneously, the second controller 256 may send a command to disengage the selectable one-way clutch 236 from the first gear ratio 214 in a controlled manner. During this process the torque is transferred from the transmission input to the output throughout the duration of the transition. If the second controller 256 engages the selectable one-way clutch 236 to drivingly couple the final drive shaft 238 to the first gear ratio 214, the second controller 256 may communicate with the first controller 254 and the sequence described above may be completed in a reverse manner.

Alternatively, for examples of other embodiments a single controller may be used for the role of the first controller 254 and second controller 256. Additionally, the number of controllers may be non-limiting, and there may be a plurality of controllers used in conjunction with the first controller 254 and second controller 256 to engage and disengage the friction clutch 220 and one-way clutch 236, respectively.

The first controller 254 and second controller 256 may be communicatively coupled to a TCU.

The first torque flow and the second torque flow 206 generate a torque from the first shaft 224 (also referred to herein as an output) of the electric machine 112 and transfers torque to the first reduction ratio 212. The output 224 of the electric machine 112 may be formed from or may be drivingly coupled to the motor shaft. The first torque flow 204 and the second torque flow 206 may be transferred to a gear 222. Gear 222 may be a pinion for output 224. Gear 222 may be the driving gear of the first reduction ratio 212. Gear 222 may drive and causes a first clutch gear 226 to rotate with the output 224 of the electric machine 112. The first clutch gear 226 may act as a driven gear for the first reduction ratio 212. The first torque flow 204 and the second torque flow 206 may be transferred into the first gear ratio 214 via the clutch shaft 228.

The first torque flow 204 may transfer torque into and affect the rotation of first gear ratio 214. The first torque flow 204 rotates a gear of clutch shaft 228 referred to herein as the second clutch gear 232. The second clutch gear 232 may act as a drive gear and transfer the torque to a first gear of the final drive shaft 238, referred to herein as the first drive gear 234. The first drive gear 234 may act as a driven gear for the first gear ratio 214. The first drive gear 234 may drivingly couple and lock with the selectable one-way clutch 236. The first torque flow 204 continues through the output of the first drive gear 234 via a final drive shaft 238. The final drive shaft 238 may transfer torque and rotate a second gear of the final drive shaft 238 referred to herein as the second drive gear 244. The first torque flow may transfer torque of the second drive gear 244 to a third gear of the final drive shaft 238 referred to herein as a final drive output 272. When not coupled to the selectable one-way clutch 236, the first drive gear 234 may rotate freely about the final drive shaft 238.

The second torque flow 206 may transfer torque into and affect the second gear ratio 216 via the clutch shaft 228 and friction clutch 220. The friction clutch 220 may be comprised of a fly wheel 262 and a plurality of friction plates 264. The friction plates 264 may lock with the fly wheel 262 so that second flow path may transfer torque into the second gear ratio 216 via the friction clutch 220. A third gear of the clutch shaft 228, referred to herein as a third clutch gear 242, may be drivingly coupled to the output of the fly wheel 262. The second gear ratio 216 may be drivingly coupled to or form the output of the fly wheel 262. The second torque flow 206 may transfer torque from the third clutch gear 242 into the second drive gear 244. The third clutch gear 242 may act as the driving gear and the second drive gear 244 may act as the driven gear of the second gear ratio 216. The second drive gear 244 may transfer torque to rotate the final drive shaft 238. The final drive shaft 238 may transfer torque from the second torque flow into the final drive output 272.

The final drive output 272 may act as the driving gear and the first gear for the final drive ratio 218. The first torque flow 204 and the second torque flow 206 may transfer torque from a final drive output 272 to a second gear of the final drive ratio 218 referred to herein as the final drive gear 274. The final drive gear 274 may be drivingly coupled to the differential 210. The differential 210 may distribute torque from the first torque flow 204 and second torque flow 206 to the first wheel 132 and the second wheel 134 of the vehicle 102. The first torque flow 204 and/or second torque flow 206 may be divided into the first torque output 144 for the first wheel 132 and a second torque output 146 for the second wheel 134 via an axle drivingly coupled to the differential 210.

The first torque flow 204 may occur when the selectable one-way clutch 236 is engaged (e.g., locked). The selectable one-way clutch 236 may lock and couple with the first drive gear 234, and therein couple the final drive shaft 238 to the first drive gear 234. Torque transferred from the first clutch gear 226 to the first drive gear 234 may then be transferred into and force the final drive shaft 238 to rotate.

The second torque flow 206 may occur when the friction clutch 220 is engaged (e.g., locked) to the clutch shaft 228. The friction plates 264 may press against the fly wheel 262 locking the clutch shaft 228 to the friction clutch 220. When the friction clutch 220 and clutch shaft 228 are locked, the torque from the clutch shaft 228 may be transferred into the third clutch gear 242. The third clutch gear 242 may be forced to rotate and transfer torque into the second drive gear 244. The second drive gear 244 may force the final drive shaft 238 to rotate.

The transmission motor system 200 may have a plurality of embodiments with variations in the friction clutch 220. For example, for one embodiment the friction clutch 220 may be a normally closed clutch. When power is turned off and the friction clutch 220 is a normally closed clutch, the friction clutch 220 may lock with clutch shaft 228. When the friction clutch 220 is a closed clutch, the friction clutch 220 may serve an additional function as a park brake when the vehicle housing transmission motor system 200 is parked. For another example, a second embodiment of the friction clutch 220 may be a normally opened clutch. When power is turned off and the friction clutch 220 is a normally opened clutch, the friction clutch 220 un-locks. The friction clutch 220 of the second embodiment may not close allowing for the transmission motor system 200 to function when power is cut.

The transmission motor system 200 may have a plurality of embodiments with variations in the selectable one-way clutch 236. For an example of a first embodiment, the selectable one-way clutch 236 may be a three position one-way clutch, having three discrete modes. Further details as to the discrete modes of the selectable one-way clutch 236 are provided at FIG. 6. For this example, the selectable one-way clutch 236 may be in a locked mode, a partially locked mode, and an open mode. The open mode may be a neutral mode for the selectable one-way clutch 236.

In another embodiment, the selectable one-way clutch 236 may be a two position one-way clutch, having two discrete modes. For this example, the selectable one-way clutch 236 may be operable in a locked mode and a partial locked mode, and the selectable one-way clutch 236 may not have a neutral mode.

Turning now to FIG. 3, a set of reference axes 301 are provided for comparison between views shown in FIG. 3, FIG. 4A, and FIG. 4B. The reference axes 301 indicate a y-axis, an x-axis, and a z-axis. In one example, the z-axis may be parallel with a direction of gravity and the x-y plane may be parallel with a horizontal plane that a transmission block 300 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

At FIG. 3, a cross-sectional view of a transmission block 300 is shown. As illustrated in FIG. 3, the components of the transmission block 300 are enclosed by a transmission body 302. The transmission block 300 may comprise a transmission 304 that is the same or similar to transmission 122, in at least one example.

As shown in FIG. 3, the transmission body 302 of the transmission block 300 may be a housing that at least partially encloses a differential 312, axle shafts, a plurality of ratios, and a plurality of clutches, where the plurality of clutches include friction clutch 344 and selectable one-way clutch 342.

The transmission block 300 may further include a hydraulic power pack enclosure wherein batteries and/or capacitors may be used to store and transfer energy to the hydraulic systems, such as a hydraulic shifting system, of the transmission block 300.

The differential 312 shown in FIG. 3 may be an electronic differential, in one or more examples. Thus, the differential 312 may also be referred to as an electronic differential herein. In one or more examples, the differential 312 may be similar to or the same as the differential 210 shown in FIG. 2.

A first axle shaft 314 and a second axle shaft 316 may be drivingly coupled to the differential 312. In at least one example, the first axle shaft 314 and the second axle shaft 316 may correspond to the first torque output 144 and the second torque output 146 shown in FIGS. 1-2, respectively.

The first axle shaft 314 may be supported by a first differential bearing 318a and the second axle shaft 316 may be supported by a second differential bearing 318b.

The transmission 304 may comprise a plurality of ratios including a first reduction ratio 332, a first gear ratio 334, a second gear ratio 336, and a final drive ratio 338. The transmission 304 may further comprise a plurality of clutches, including the selectable one-way clutch 342 and the friction clutch 344 which are shown enclosed by dashed lines. The gears of the first reduction ratio 332, first gear ratio 334, and second gear ratio 336 that may be aligned with the friction clutch 344 such that the first reduction ratio 332, first gear ratio 334, and second gear ratio 336 may be mechanically coupled via a clutch shaft 348.

The gears of the first gear ratio 334, second gear ratio 336, and final drive ratio 338 may be aligned along the same axis, such that the centerlines and center axes of the ratios may be parallel with the axis of the selectable one-way clutch 342 may be centered about. The first gear ratio 334, second gear ratio 336, and final drive ratio 338 may be drivingly and mechanically coupled via a final drive shaft 350 when the selectable one-way clutch 342 is engaged.

Many of the elements shown in FIG. 3 may correspond to elements introduced in FIG. 2. For example, the first reduction ratio 332 may be the same or similar to the first reduction ratio 212, and therein contain the same or similar components. The first gear ratio 334 may be the same or similar to the first gear ratio 214, and therein contain the same or similar components. The second gear ratio 336 may be the same or similar to the second gear ratio 216, and therein contain the same or similar components. The final drive ratio 338 may be the same or similar to the final drive ratio 218, and therein contain the same or similar components. The friction clutch 344 may be the same or similar to the friction clutch 220, and therein contain the same or similar components. The selectable one-way clutch 342 may be the same or similar to selectable one-way clutch 236, and therein contain the same or similar components. The clutch shaft 348 may be the same or similar to the clutch shaft 228. Lastly, the final drive shaft 350 may be the same or similar to the final drive shaft 238.

Turning to FIG. 4A, a partial cutaway view 400 of a dynamic controllable clutch (DCC) 402 and a first drive gear 412 are shown. The DCC 402 may be the same or similar to the selectable one-way clutch 342 of FIG. 3 and/or the selectable one-way clutch 236 of FIG. 2, for example. The first drive gear 412 may be and act the same or similar to the first drive gear 234 with reference to FIG. 2. The DCC 402 may be centered on a longitudinal axis 404. The DCC 402 may be located radially about the longitudinal axis 404. The DCC 402 may circumferentially surround the longitudinal axis 404.

The DCC 402 may act as a linear motor, and therein may be formed of a stator 406 and a translator system 408. The stator 406 may be stationary while the translator system 408 may move approximately linearly. The translator system 408 may translate or slide in an axial direction with respect to longitudinal axis 404.

The stator 406 may consist of wire coils, such as copper wire coils, and plates, such as steel plates, that may be used to generate electromagnetic forces to move the translator system 408 axially, with respect to axis 404. That is, the coils may be activated to generate electromagnetic forces to move the translator system 708 axially. The translator system 408 may incorporate a magnet assembly 410. The magnet assembly 410 may be formed of at least one magnet to be translated by the electromagnetic forces generated by the stator 406. The magnet assembly 410 may be formed of a plurality of magnets. The magnet or magnets of the magnet assembly 410 may be permanent magnets. The electromagnetic forces of the stator may push or pull the magnet assembly 410 and other components of the translator system 408 in first direction toward or in a second direction away from the first drive gear 412.

The DCC 402 may be formed of a coupling ring 414, a sliding sleeve 416, a friction plate 420, the magnet assembly 410, and a translator 424. The components of the stator 406 may be enclosed by and formed within a coupling ring 414. The sliding sleeve 416, friction plate 420, the magnet assembly 410, and translator 424 may form the translator system 408. The coupling ring 414 may secure the DCC 402 to the transmission body 302 or another part of the transmission block 300. A plurality of fasteners 418 may be enclosed by the material of the friction plate 420 and abut the first drive gear 412. The fasteners 418 may fasten a control element 419 to the friction plate 420. Control element 419 may be positioned axially, with respect to the longitudinal axis 404, between the friction plate 420 and the first drive gear 412.

The coupling ring 414 may provide support to and be located radially, with respect to longitudinal axis 404, about the magnet assembly 410. The coupling ring 414 may have an extension 415. The extension 415 may have a plurality of recesses, grooves and other features that may be used to couple or fasten to other component, such as a mount.

The coupling ring 414 may have a plurality of lands 435 that extend radially toward the longitudinal axis 404. At least one of the lands 435 may be located radially about the magnet assembly 410 and axially between the first plate 422a and the second plate 422b, with respect to the longitudinal axis 404. The lands 435 may prevent the magnet assembly 410 and other components of the translator system 408 from moving axially, with respect to longitudinal axis 404 without a deliberate force generated by the stator 406.

The magnet assembly 410, first plate 422a, and second plate 422b may be located radially, with respect to longitudinal axis 404, about and drivingly coupled to the translator 424. The first plate 422a and second plate 422b may be located on opposite sides of the magnet assembly 410, with respect to the longitudinal axis 404. The coupling ring 414, sliding sleeve 416, magnet assembly 410, first plate 422a, second plate 422b, and translator 424 may be aligned, such that the coupling ring 414, sliding sleeve 416, magnet assembly 410, first plate 422a, second plate 422b, and translator 424 may be approximately centered about the longitudinal axis 404.

A first passage 412a may be formed from and located centrally within the first drive gear 412. The first passage 412a may be approximately centered about the longitudinal axis 404 when the first drive gear 412 is approximately centered about the longitudinal axis 404. The first passage 412a may have an inner surface 412b that may be radial and smooth with respect to the longitudinal axis 404. A plurality of first teeth 412c may be formed from or coupled to the first drive gear 412. The plurality of teeth 412c may be located radially, with respect to the longitudinal axis 404, about the perimeter of the first drive gear 412. Likewise, a plurality of cavities 412d may be located radially, with respect to the longitudinal axis 404, between the inner surface 412b and first teeth 412c. The cavities 412d are enclosed by material of the first drive gear 412 and have openings that may face the translator system 408. The first teeth 412c may mesh with the teeth of another gear to drivingly couple the first drive gear 412 to another gear. The first passage 412a may be of a first diameter 412e. The first diameter 412e may act as an inner diameter for the first drive gear 412. The cavities 412d may be open to and positioned closest axially, with respect to the longitudinal axis 404, to the friction plate 420 and control element 419.

A second passage 420a may be formed from and located centrally within the friction plate 420. The second passage 420a may be approximately centered about the longitudinal axis 404 when the friction plate 420 is approximately centered about the longitudinal axis 404. A plurality of second teeth 420b may be located about the inner surface of the second passage 420a. The second teeth 420b may be complementary to a plurality of notches or grooves in a shaft, such as a shaft 433 with reference to FIG. 4B. The second passage 420a may be of a second diameter 420d. The second diameter 420d may act as an inner diameter for the friction plate 420.

A third passage 424a may be formed from and located centrally within the translator 424. The third passage 424a may be approximately centered about the longitudinal axis 404 when translator 424 is approximately centered about the longitudinal axis 404. A plurality of third teeth 424b may be located about the inner surface of the second passage 420a. The third teeth 424b may be complementary to a plurality of notches or grooves in a shaft, such as the shaft 433 with reference to FIG. 4B. The third passage 424a may be of a third diameter 424d. The third diameter 424d may act as an inner diameter for the translator 424.

A ring 426 may be positioned approximately radially, with respect to longitudinal axis 404, about the translator 424. The first plate 422a may partially enclose and be located radially, with respect to the longitudinal axis 404, about the ring 426. The ring may be fit to and located radially about a groove 428 in the translator 424. The ring 426 may abut surfaces of the first plate 422a and translator 424. When inserted about the groove 428, the ring 426 may fasten the translator 424 to the first plate 422a. The ring 426 may prevent the translator 424 from being decoupled or misaligned with respect to the first plate 422a. A ring similar in function and dimension to ring 426 may be partially enclose and located radially, with respect to the longitudinal axis 404, within the second plate 422b. The aforementioned ring may help fasten the second plate 422b to the translator 424.

The translator 424 and magnet assembly 410 may move along, in an axial direction, with respect to the longitudinal axis 404, therein moving the sliding sleeve 416. When components of the sliding sleeve 416 are pressed against the friction plate 420, the DCC 402 may be referred to as locked against the first drive gear 412. When locked, the friction plate 420 and translator 424 may be drivingly coupled to and may rotate with the first drive gear 412.

The friction plate 420 and translator 424 may circumferentially surround and couple to a final drive shaft, such as the final drive shaft 350, which may be approximately collinear with the longitudinal axis 404. When locked with the friction plate 420, the torque of the first drive gear 412 may be transferred into the final drive shaft 350 via the friction plate 420 and translator 424.

The translator 424 may mechanically couple to, be supported by, and be circumferentially surrounded by the magnet assembly 410, the first plate 422a, and the second plate 422b. The magnet assembly 410, the first plate 422a, and the second plate 422b may allow the translator 424 and friction plate 420 to rotate within the coupling ring 414.

Turning to FIG. 4B, a cutout side view 430 is shown of the DCC 402 and first drive gear 412 in a clutch enclosure 432. The clutch enclosure 432 may be a part of the transmission block 300. The clutch enclosure 432 surrounds the DCC 402 and first drive gear 412. The clutch enclosure 432 may form a housing and a fastening surface for the DCC 402. The DCC 402 may be located radially, with respect to longitudinal axis 404, about a shaft 433. The first passage 412a, second passage 420a, and third passage 424a may be located radially, with respect to longitudinal axis 404, about the shaft 433. The second diameter 420d and third diameter 424d may be greater than and enclose a diameter 433a of the shaft 433.

The coupling ring 414 may couple against the clutch enclosure 432, therein coupling the DCC 402 to the clutch enclosure 432. The extension 415 of the coupling ring 414 may extend outside of the clutch enclosure via a passage. The passage may be centered on an axis that is approximately parallel with the longitudinal axis 404. The extension 415 may abut against an outer surface 436 of the clutch enclosure 432. The extension 415 may have a plurality of appendages 438 that may help fasten the coupling ring 414 to the clutch enclosure 432. The appendages 438 may be complementary with a plurality of holes in outer surface 436. When aligned such that the appendages 438 may be inserted into their complementary holes on the outer surface 436, the extension 415 may couple to the clutch enclosure 432.

The sliding sleeve 416 may press against the friction plate 420 with a plurality of springs 434. A clip 440 that is circular in shape may be located about and be in surface sharing contact with the friction plate 420. The clip 440 may be located axially, with respect to the longitudinal axis 404, between the sliding sleeve 416 and the friction plate 420. The clip 440 may be coupled to the first drive gear 412 via a groove 441. Groove 441 may extend radially into the material of the first drive gear 412 with respect to the longitudinal axis 404. The clip 440 may remain coupled to the first drive gear 412 and may not translate in a direction along the longitudinal axis 404. The clip 440 may drivingly couple and prevent the decoupling of the friction plate 420 from the first drive gear 412. When aligned with the friction plate 420, the sliding sleeve 416 may be approximately centered on and radial to the longitudinal axis 404. A land 442 may extend radially, with respect to the longitudinal axis 404 from the coupling ring 414. The land 442 may be fit to a groove 444 that extends radially, with respect to the longitudinal axis 404, into the material of the clutch enclosure 432.

The coupling ring 414 may have a plurality of lands 435 that extend radially toward the longitudinal axis 404. At least one of the lands 435 may be located radially about the magnet assembly 410 and be partially enclosed by the first plate 422a and second plate 422b. The first plate 422a and second plate 422b may be located on opposite sides axially, with respect to longitudinal axis 404, of at least one of the lands 435. The lands 435, first plate 422a, and second plate 422b may prevent the magnet assembly 410 and other components of the translator system 408 from moving axially, with respect to longitudinal axis 404, without a deliberate force generated by the stator 406.

The friction plate 420 may act as an input and the first drive gear 412 may act as an output for the locking mechanism of DCC 402. A plurality of locking elements, such as struts, may be hingingly coupled to the friction plate 420. The locking elements may be pressed upon by the springs 434 via the translation of the sliding sleeve 416 axially, with respect to the axis 404, toward the friction plate 420. Each of the cavities 412d may be complimentary with a locking element and an opening in the control element 419. When pressed by the springs 434, each of the locking elements may be pressed through the openings in the control element 419 and into the cavities 412d. The pressing of the locking elements into the cavities 412d may lock the first drive gear 412 and friction plate 420, and drivingly couple the shaft 433 to the first drive gear 412. For this example, there may be two types of locking elements for the cavities 412d, such that the DCC 402 may engage in two to three discrete states. The locking mechanism of the locking elements may be further illustrated via a schematic shown in FIG. 6.

A ring 446 may be located radially, with respect to the longitudinal axis 404, about translator 424. The sliding sleeve 416 may have a rim 447 that may be inserted axially, with respect to the longitudinal axis 404, between the ring 446 and a shoulder 448. The shoulder 448 may be formed and extend radially, with respect to the longitudinal axis 404, from the translator 424. The ring 446 may be used to fasten sliding sleeve 416 to translator 424.

A ring 482 may be located radially, with respect to longitudinal axis 404, about and fit to a groove 484. The groove 484 may be located radially, with respect to the longitudinal axis 404, about and formed from the shaft 433. The ring 482 may abut a surface 486 of the friction plate 420. The ring 482 may help fasten the friction plate 420 to shaft 433. Portions of the friction plate may extend into a groove 484 and a groove 488 of the shaft 433. Groove 488 may be fluidly coupled to a passage 490. Passage 490 may act as a passage for lubricant to flow between the volume of the enclosure 432 and a bearing 492. The bearing 492 may support and allow the first drive gear 412 to rotate freely about the shaft 433. The bearings 492 may be located radially, with respect to the longitudinal axis 404 between the first drive gear 412 and the shaft 433, wherein the inner surface 412b may be in surface sharing contact with the bearings 492. The diameter 412e, with reference to FIG. 4A, may be greater than the diameter 494. Diameter 494 may be an outer diameter of the bearings 492.

FIG. 4C shows a diagram of a clutch engagement table 450. The columns of the clutch engagement column show the modes a dynamic controllable clutch, such as DCC 402 and selectable one-way clutch 236, may be engaged in.

These modes are discrete states of the DCC 402 and may include one or more of a locked mode 452, a one-way clutch (OWC) mode 454, and an open mode 456. The clutch engagement table 450 shows whether components of the DCC 402 may be in the locked mode 452, the OWC mode 454, and the open mode 456. The degrees of movement and torque transfer in the locked mode 452 may be shown in a first column 453. The degrees of movement and torque transfer in the OWC mode 454 may be shown in a second column 455. The degrees of movement and torque transfer in open mode 456 may be shown in a third column 457. The first row 458 may show the status of the output of the DCC 402 and the second row 460 may show the status of the input of the DCC 402. The modes in the clutch engagement table 450 may also be referred to as states and may correspond with the previously described discrete states. For example, the transfer torque locked mode 452, the OWC mode 454, and the open mode 456 may correspond with the fully locked state, the OWC state, and the fully open state, respectively. The open mode 456 may also be referred to as a fully open mode due to the OWC mode 454 being partially open.

The direction of the torque may be represented by arrows. As shown by a diagram 462, arrows in a first direction 464 may indicate an anti-clockwise direction and arrows in a second direction 466 may indicate a clockwise direction of movement. A second table 470 shows if an arrow is darkened, such as in a first row 472, torque may be transferred. The second table 470 shows if an arrow is shaded a lighter color, such as in second row 474, torque may not be transferred.

The locked mode 452 may be the locked mode described in the first and second embodiment of the selectable one-way clutch 236 with reference to FIG. 2. The OWC mode 454 may be the partially locked mode in the first and second embodiment of the selectable one-way clutch 236 with reference to FIG. 2. The open mode 456 may be the open mode and may act as a neutral mode described with respect first embodiment of the selectable one-way clutch 236 with reference to FIG. 2. For an example of a first embodiment, the DCC 402 may be able to engage in the locked mode 452, the OWC mode 454, and the open mode 456. For an example of a second embodiment, the DCC 402 may be able to engage in the locked mode 452 and the OWC mode 454.

Table 450 shows in the locked mode 452, the OWC mode 454, and the open mode 456, torque may be transferred to the input in the anti-clockwise and clockwise directions relative to the axis the DCC 402 is centered about. In the fully locked mode 452 torque may be transferred to the output in the anti-clockwise and clockwise directions. For an example embodiment of the DCC 402, when in the OWC mode 454 torque may be transferred to the output in the anti-clockwise direction but may not be transferred in the clockwise direction. For an alternative embodiment of the DCC 402, in the OWC mode 454 torque may be transferred to the output in a clockwise direction but may not be transferred in an anti-clockwise direction. In the open mode 456 torque may not be transferred to the output in either the anti-clockwise or clockwise directions.

There may be two variations of the DCC 402. For an example of a first embodiment of DCC 402, the DCC 402 may be able to engage in three modes: the locked mode 452, the OWC mode 454, and the open mode 456. For an example of a second embodiment the DCC 402, the DCC 402 may be able to engage in two modes: the locked mode 452 and the OWC mode 454. For this example, the DCC 402 may not be able to engage in a neutral position (e.g., the open mode 456) where the components of the clutch are drivingly un-coupled.

The DCC 402 may have locking elements, such as a forward strut and a reverse strut. In the locked mode 452 the forward and reverse struts may be engaged. In the OWC mode 454 the forward strut may be disengaged and the reverse strut may be engaged. In the open mode 456 the forward and reverse struts may be disengaged. In the locked mode 452, the translator 424 may be translated toward the first drive gear 412, such that the sliding sleeve 416 and springs 434 may abut the friction plate 420. In the OWC mode 454, the translator 424 may be translated toward the first drive gear 412, such that the sliding sleeve 416 may not abut against the friction plate 420, but the springs 434 may abut the friction plate 420. In the open mode 456, the translator may be translated away from the first drive gear 412, such that neither the sliding sleeve 416 nor the spring abut the friction plate 420.

Turning to FIG. 5, a hydraulic circuit diagram 500 may be shown to control the hydraulic systems of the transmission system 120 and transmission block 300. The hydraulic circuit diagram 500 may represent a hydraulic shifting system used in transmission system 120. Work fluid, such as an oil, may be used in the components of hydraulic circuit diagram 500. Work fluid may be stored in a sump 506. The hydraulic circuit diagram 500 transports and changes the pressure of work fluid to affect components such as a park lock actuator 512, an electronic differential 514, a friction clutch 516, and a gear clutch lubrication/cooling system 518. When fluid is not delivered. An electronic differential 514 may be the same as differential 210 with reference to FIG. 2. The friction clutch 516 may be the friction clutch 220 with reference to FIG. 2. The gear clutch lubrication/cooling system 518 may be used to cool components of the transmission system 120 and/or transmission block 300 as well as lubricate gears, such as the first clutch gear 226 and the second clutch gear 232.

The park lock actuator 512 may be used to set a park lock. For one example the park lock of the park lock actuator 512 may be an open clutch. For this example, the increase in pressure and delivery of work fluid to the park lock actuator 512 may close and lock the clutch and the park brake. The reduction in pressure and/or prevention of work fluid delivery to the park lock actuator 512 may open and unlock the clutch and the park brake. For another example the park lock of the park lock actuator 512 may be a closed clutch. For this example, the increase in pressure and delivery of work fluid to the park lock actuator 512 may open and unlock the clutch and the park brake. The reduction in pressure and/or prevention of work fluid delivery to the park lock actuator 512 may close and lock the clutch and the park brake. For one example the park lock controlled by the park lock actuator 512 may be the friction clutch 220.

The work fluid may be delivered and used in the park lock actuator 512, the electronic differential 514, a friction clutch 516, and a gear clutch lubrication/cooling system 518 by an electric motor 522, a first pump 524, and a second pump 526. The electric motor 522 may be the electric machine 112 or with reference to FIG. 1. The electric motor 522 may power the first pump 524 and second pump 526 to create suction. Work fluid may be taken by the first pump 524 and second pump 526 from the sump 506 and filtered through a suction filter 528. The first pump 524 may deliver work fluid to components without additional filtering. The second pump 526 may deliver work fluid to components through and additional suction filter 532.

The first pump 524 and the second pump 526 may deliver work fluid to the gear clutch lubrication/cooling system 518. The second pump 526 may deliver work fluid to the gear clutch lubrication/cooling system 518 through first electronic valve 534. Work fluid from the first pump 524 and the second pump 526 may be cooled by a fluid cooler 536 before being delivered to gear clutch lubrication/cooling system 518. Work fluid may be delivered to the gear lubrication cooling system through a bypass and separator 538, wherein some work fluid may be filtered while some may travel directly to the gear clutch lubrication/cooling system 518. Below a threshold pressure for the work fluid, such as 1.2 bar, the bypass may be closed and work fluid may travel through a separator 538a of the bypass and separator 538. If the pressure of the work fluid increases above a threshold, such as for example 1.2 bar, a valve 538b of the bypass and separator 538 may be opened, allowing work fluid to travel through the valve 538b and bypass and through the separator 538.

Some work fluid may be siphoned and returned to the sump 506 though a first roller spring activated valve 540a for the first pump 524 and the second pump 526 and a second roller spring activated valve 540b for the second pump 526 should the pressure of the work fluid exceed a maximum threshold pressure. For example, the first roller spring activated valve 540a may be opened when the pressure of the work fluid exceeds a pressure threshold of 18 bar. For another example, the second roller spring activated valve 540b opened when the pressure of the work fluid exceeds a pressure threshold of 35 bar.

Work fluid may be delivered to the park lock actuator 512, the electronic differential 514, and the friction clutch 516 via the second pump 526. The second pump 526 may deliver work fluid to the park lock actuator 512, the electronic differential 514, and the friction clutch 516 through a third roller and spring activated valve 542. An accumulator 548 may be positioned after and fluidly coupled to the outlet of the spring activated valve 542.

Work fluid may be delivered to the park lock actuator 512 through a VGP valve 544 and through a second electronic valve 546. The second electronic valve 546 has a bypass that may lead directly to the park lock actuator 512. The bypass may be opened by a pressure valve 550 should the pressure of the work fluid become greater threshold pressure before the second electronic valve 546. Excess work fluid may be diverted by the VGP valve 544 to the sump 506.

Work fluid may be delivered to the electronic differential 514 and friction clutch 516 through a valve, such as a VSS1 valve 552. Excess work fluid may be diverted from the VSS1 valve 552 to the sump 506. Work fluid delivered to the electronic differential 514 may exit the electronic differential and returned to the sump 506.

Work fluid may travel though a valve, such as a VKP-ED valve 556, to enter the electronic differential 514. Work fluid may travel through a valve, such as a VKP-FC valve 554 to enter the friction clutch 516. Work fluid sent to the electronic differential 514 and friction clutch 516 may act as a lubricant and a coolant to remove and mitigate thermal energy. Excess fluid may be diverted from the VKP-ED valve 556 and VKP-FC valve 554 to the sump 506. Work fluid passed through and utilized as lubricant and/or coolant by the electronic differential 514 may be returned to the sump 506. Work fluid passed through and utilized as lubricant and/or coolant by the friction clutch 516 may be returned to the sump 506.

An actuator pressure sensor 560 may monitor the pressure of work fluid traveling from the second pump 526 to the park lock actuator 512, the electronic differential 514, and the friction clutch 516. A lubrication pressure sensor 562 may monitor the pressure of work fluid sent to the gear clutch lubrication/cooling system 518 before entering the fluid cooler 536. An Electronic Differential pressure sensor 564 may monitor the pressure of work fluid before entering the electronic differential 514. Friction clutch pressure sensor 566 may monitor the pressure of work fluid before entering the friction clutch 516. The sensors described above may be used in conjunction with a controller, such as a TCU, to adjust valves, the motor 522, and the first pump 524 and the second pump 526 to change the pressure and flow rate of work fluid for the park lock actuator 512, the electronic differential 514, and the friction clutch 516.

For example, the differential pressure sensor 564 may send a signal to a controller. If a pressure decrease below a first pressure threshold is detected by the differential pressure sensor 564, or a greater pressure is requested by the controller, the controller may send a command signal to the VKP-ED valve 556 to deliver more work fluid to the electronic differential 514 and less fluid to the sump 506. The VKP-ED valve 556 may remain under these conditions until the pressure of work fluid detected by the differential pressure sensor 564 increases to a threshold pressure set by the controller. For another example, if the pressure increase above a second threshold is detected by the differential pressure sensor 564, or a lesser pressure is requested by the controller, the controller may send a command signal to the VKP-ED valve 556 to deliver less fluid to the electronic differential 514 and more fluid to the sump 506. The VKP-ED valve 556 may remain under these conditions until the pressure of work fluid detected by the differential pressure sensor 564 decreases to a threshold pressure set by the controller.

For another example, the friction clutch pressure sensor 566 may send a signal to a controller. If a pressure decrease below a first pressure threshold is detected by the friction clutch pressure sensor 566, or a greater pressure is requested by the controller, the controller may send a command signal to the VKP-FC valve 554 to deliver more work fluid to the friction clutch 516 and less fluid to the sump 506. VKP-FC valve 554 may remain under these conditions until the pressure of work fluid detected by the friction clutch pressure sensor 566 increases to a threshold pressure set by the controller. For another example, if the pressure increase above a second pressure threshold is detected by the friction clutch pressure sensor 566 or a lesser pressure is requested by the controller, the controller may send a command signal to the VKP-FC valve 554 to deliver less fluid to the electronic differential 514 and more fluid to the sump 506. VKP-FC valve 554 may remain under these conditions until the pressure of work fluid detected by the friction clutch pressure sensor 566 decreases to a threshold pressure set by the controller.

A temperature sensor 572 may be used to monitor the temperature of work fluid before entering a gear clutch lubrication/cooling system 518. Data from the temperature sensor 572 may be used to adjust the fluid cooler 536 to increase or decrease the temperature of the work fluid.

Turning to FIG. 6, it shows a schematic 600 of discrete operational states for DCC 602, where the DCC 602 may be the selectable one-way clutch 236 and/or DCC 402 of FIG. 2 and FIG. 4A and FIG. 4B, respectively. The schematic 600 shows the DCC 602 in the locked mode 452, OWC mode 454, and the open mode 456.

The DCC 602 may include an output 612, an input 614, and a plurality of coils. For an example, there may be three coils in the form of a first coil 616, a second coil 618, and a third coil 620. In other examples, there may be fewer coils. For example, there may be only be two coils of the first coil 616, second coil 618, or third coil 620. In such two coil examples, the input 614 may be located between the output 612 and the coils.

When the DCC 602 is in the locked mode 452, the input 614 and output 612 may rotate together either in a first direction 464 or together in a second direction 466. That is, when in the locked mode 452, the output 612 and input 614 may be in a fully locked state, and may be drivingly coupled and move in a same direction, either the first direction 464 or the second direction 466, together.

When the DCC 602 is in the OWC mode 454, the output 612 and input 614 may be locked, such as to be drivingly coupled and move in the second direction 466. In contrast to the locked mode 452 where the input 614 and the output 612 may be moved in either the first direction 464 or the second direction 466, torque is only transferred to the output 612 in the second direction 466 for the OWC mode 454.

When the DCC 602 is in the open mode 456, the output 612 and the input 614 may be drivingly un-coupled and thus move independently from one another. When in the open mode 456 the output 612 and input 614 may unlocked, such as to be drivingly un-coupled and move independently of each other in the first direction 464 or second direction 466.

A plurality of holes may align to form two channels that pass through the input 614, the first coil 616, the second coil 618, and the third coil 620. In particular, a first channel 632 may be formed on a first side of the DCC 602 and a second channel 634 may be formed on a second side of the DCC 602. The first channel 632 may house a first spring 636 and a first base 652, and the second channel 634 may house a second spring 638 and a second base 654.

The DCC 402 may further comprise two locking elements including a first locking element 642 and a second locking element 644. In some examples, the DCC 402 may have a plurality of first locking elements 642 and second locking elements 644. The first locking element 642 and the second locking element 644 may be struts, in at least one example, where the first locking element 642 may be a first strut acting as a forward strut, and the second locking element 644 may be a second strut acting as a reverse strut. Each of the first locking element 642 and the second locking element 644 may be hingingly coupled to the input 614.

The first spring 636 may press against and make surface sharing contact with the first locking element 642, and the second spring 638 may press against and make surface sharing contact with the second locking element 644. Each of the first locking element 642 and the second locking element 644 may further be selectively coupled to the input 614. In order to engage with the input 614, the first locking element 642 may be hingingly rotated toward and be partially enclosed by a first cavity 646. The second locking element 644 may be hingingly rotated toward and be partially enclosed by a second cavity 648. In other words, the first locking element 642 and the second locking element 644 are pivoted via the corresponding first spring 636 and second spring 638. The first spring 636 may pivotally bias the first locking elements 642 outwardly for locking the first locking element 642 with the first cavity 646. The second spring 638 may pivotally bias the second locking elements 644 outwardly for locking the second locking element 644 with the second cavity 648. The first cavity 646 and the second cavity 648 may be example variations of cavities 412*d* with reference to FIG. 4A-4B.

The first spring 636 may be coupled to a first base 652. The second spring 638 may be coupled to a second base 654. The first spring 636 and first base 652 may be translated axially with respect to a first centerline 656 of the first channel 632. The second spring 638 and second base 654 may be translated axially with respect to a second centerline 658 of the second channel 634. For an example of one embodiment, the first base 652 and second base 654 may be ferric or electromagnetic, such that a current through the first coil 616, second coil 618, and third coil 620 may drive the first base 652 and/or second base 654 axially along the first centerline 656 and/or second centerline 658, respectively. For this example, the first coil 616, second coil 618, and third coil 620 may act as a solenoid. For an example of one embodiment, the use of a single coil, such as the first coil 616, second coil 618, or third coil 620, may allow for the DCC to be engaged in the locked mode 452 or OWC mode 454, but not the open mode 456. However, it is to be appreciated that the mechanism for extending the springs and their respective bases may be non-limiting. Other methods of actuation may be used to translate the first spring 636 and the second spring 638 to press against the first locking element 642 and the second locking element 644, respectively.

In the locked mode 452, the DCC 602 is in a fully locked state with both the first locking element 642 and the second locking element 644 engaged with the output 612. To transition the DCC 602 into the locked mode 452 (from the OWC mode 454 or from the open mode 456), both the first spring 636 and the second spring 638 may be translated toward and pressed against the first locking element 642 and the second locking element 644, respectively. The first locking element 642 and the second locking element 644 may in turn be rotated by the first spring 636 and the second spring 638 into an engaged position with the output 612.

Thus, as can be seen in FIG. 6, the first locking element 642 and the second locking element 644 are engaged in the locked mode 452, as both the first locking element 642 and the second locking element 644 abut and are in contact with the output 612. In the engaged position shown in the locked mode 452, the first locking element 642 may prevent the input 614 from moving independently of the output 612 in the first direction 464, therein transferring torque between the input 614 and output 612. Likewise, the first locking element 642 may prevent the output 612 from moving independently of the input 614 in the second direction 466, therein transferring torque between the input 614 and output 612. The second locking element 644 may prevent the input 614 from moving independently of the output 612 in the second direction 466, therein transferring torque between the input 614 and output 612. Likewise, the second locking element 644 may prevent the output 612 from moving independently of the input 614 in the first direction 464, therein transferring torque between the input 614 and output 612.

In the OWC mode 454, the DCC 602 is in a one-way clutch state in which the first locking element 642 is engaged with the output 612 and the second locking element 644 disengaged from the output 612. In the transition from the open mode 456 to the OWC mode 454, the first locking element 642 is moved from a disengaged position in the open mode 456 to an engaged position in the OWC mode 454. Further, the second locking element 644 is maintained in a disengaged position in the transition from the open mode 456 to the OWC mode 454.

To transition from the open mode 456 to the OWC mode 454, the first spring 636 may be translated toward and pressed against the first locking element 642 to pivot the first locking element 642 into an engaged positon with the output 612. The second spring 638 may also be translated in a direction towards the second locking element 644 when transitioning from the open mode 456 to the OWC mode 454. However, in contrast to the first spring 636 and the first locking element 642, the second spring 638 does not pivot the second locking element 644 into an engaged position when transitioning from the open mode 456 to the OWC mode 454. Rather, the second locking element 644 is maintained in a disengaged position though the second spring 638 may be translated towards the second locking element 644 in the transition from the open mode 456 to the OWC mode 454.

To transition from the locked mode 452 to the OWC mode 454, the first spring 636 is maintained in a position pressed against the first locking element 642, such that the first locking element 642 stays engaged with the output 612. The second spring 638 is further translated away from the second locking element 644 when transitioning from the locked mode 452 to the OWC mode 454 to disengage the second locking element 644 from the output 612.

Thus, in the transition from the open mode 456 to the OWC mode 454, the first locking element 642 may be pivotally rotated via translation of the first spring 636 towards the output 612, such that the first locking element 642 is positioned within the first cavity 646 and in an engaged position. In the engaged position, the first locking element 642 may abut and be in surface sharing contact with surfaces of the output 612 defining first cavity 646. Further, in the transition from the open mode 456 to the OWC mode 454, the second locking element 644 may not be pivotally rotated and may instead remain retracted into the input 614. When in the OWC mode 454, the first locking element 642 may prevent the input 614 from moving independently of the output 612 in the first direction 464. The first locking element 642 may further prevent the output 612 from moving independently of the input 614 in the second direction 466. As such, in the OWC mode 454, when the input 614 spins in the second direction 466, the first locking element 642 may be pressed down into the input 614 by the output 612. Likewise, when the output 612 spins in the first direction 464 the first locking element 642 may be pressed down into the input 614 by the output 612.

Looking now to the open mode 456 shown in FIG. 6, the first spring 636 and the second spring 638 are both completely disengaged from the output 612. In order to transition from the locked mode 452 or the OWC mode 454 to the open mode 456, the first spring 636 and the second spring 638 may be translated away from the first locking element 642 and the second locking element 644, respectively. The first locking element 642 and the second locking element 644 may be retracted into the input 614 when in the open mode 456, in at least one example. By both the first spring 636 and the second spring 638 being disengaged from the output 612 in the open mode 456, the input 614 may move freely in the first direction 464 or second direction 466. The output 612 may also move freely in the first direction 464 or second direction 466 in the open mode 456.

Thus, disclosed herein is a two speed transmission that may incorporate at least two reduction sets. Each reduction set may drivingly couple at least two shafts, wherein first reduction set may be selectively coupled to a first shaft via a DCC, and the second reduction set may be selectively coupled to a second shaft via a friction clutch. The DCC is a selectable one-way clutch that is dynamically controllable to transition between a plurality of discrete states. Each reduction set may be of a ratio of a different effective distance, such that each reduction set may produce different rotational speed and torque outputs for the transmission. The DCC may be used to increase the speed of rotation, rotation per minute (RPM), of an output element up to the same speed as a rotating element. As a dynamic clutch, the DCC may absorb the change of kinetic energy of the non-rotating element. The rotating element may be an input element and the stationary element may be an output element.

For example, the DCC may have three discrete states. The discrete states may include a fully locked state, a one-way clutch (OWC) state, and a fully open state. In another example, the DCC may have two discrete states. For this other example, the discrete states may include a fully locked state and a one-way clutch (OWC) state.

The disclosure also provides support for a transmission system for a vehicle, comprising: an input configured to couple to a prime mover of the vehicle, a first gear ratio, a second gear ratio, a dynamic controllable clutch (DCC), a friction clutch, an output, and a controller comprising instructions stored in non-transitory memory that are executable by the controller to: adjust a state of the DCC and a state of the friction clutch to selectively engage the first gear ratio and the second gear ratio for providing torque transfer from the input to the output of the transmission system. In a first example of the system, the controller further comprises instructions to: operate the vehicle with the DCC in a completely disengaged state. In a second example of the system, optionally including the first example, the controller further comprises instructions to: transition the DCC from an open mode to a one-way clutch (OWC) mode, wherein the DCC is in a completely disengaged state in the open mode, and then transition the DCC from the OWC mode to a locked mode, wherein the open mode, the OWC mode, and the locked mode are discrete states of the DCC. In a third example of the system, optionally including one or both of the first and second examples, the second gear ratio is transitioned from a disengaged state to an engaged state via the friction clutch. In a fourth example of the system, optionally including one or more or each of the first through third examples, the first gear ratio is a higher gear ratio than the second gear ratio. In a fifth example of the system, optionally including one or more or each of the first through fourth examples, the transmission system is a two speed transmission. In a sixth example of the system, optionally including one or more or each of the first through fifth examples, the DCC is a selectable one-way clutch. In a seventh example of the system, optionally including one or more or each of the first through sixth examples, the state of the DCC is adjusted via actuation of one or more locking elements. In a eighth example of the system, optionally including one or more or each of the first through seventh examples, adjusting the state of the DCC includes activating one or more coils.

The disclosure also provides support for a transmission system for a vehicle, comprising: an input configured to couple to a prime mover of the vehicle, a first gear ratio, a second gear ratio, a dynamic controllable clutch (DCC), a friction clutch, an output, and a controller comprising instructions stored in non-transitory memory that are executable by the controller to: during a first condition, operate the DCC in a first mode in which the DCC is in an engaged state, and transfer torque from the input to the output via the DCC while maintaining the friction clutch disengaged. In a first example of the system, the controller further comprises instructions to: during a second condition, gradually apply the friction clutch, while disengaging the DCC. In a second example of the system, optionally including the first example, the first gear ratio is a higher gear ratio than the second gear ratio. In a third example of the system, optionally including one or both of the first and second examples, the DCC is operable in a plurality of discrete states, and wherein the DCC is not gradually transitioned between the plurality of discrete states. In a fourth example of the system, optionally including one or more or each of the first through third examples, the controller further comprises instructions to: during a second condition, operate the friction clutch in an engaged state to transfer the torque from the input to the output via the second gear ratio and the friction clutch, wherein the DCC is completely disengaged during the second condition. In a fifth example of the system, optionally including one or more or each of the first through fourth examples, the output provides driving torque to one or more wheels of the vehicle. In a sixth example of the system, optionally including one or more or each of the first through fifth examples, the first gear ratio and the second gear ratio are constantly in mesh. In a seventh example of the system, optionally including one or more or each of the first through sixth examples, the controller further comprises instructions to: during a second condition, operate the friction clutch in an engaged state to transfer the torque from the input to the output via the friction clutch, wherein the DCC is operated in a second mode during the second condition, and wherein the second mode of the DCC includes the DCC being disengaged during the second condition, and transition from operating the DCC from the second mode to the first mode by gradually disengaging the friction clutch to gradually decrease an amount of the torque transferred from the input to the output via the friction clutch and the second gear ratio, while engaging the DCC.

The disclosure also provides support for a transmission system for a vehicle, comprising: an input configured to couple to a prime mover of the vehicle, a first gear ratio, a second gear ratio, a dynamic controllable clutch (DCC), a friction clutch, an output, and a controller comprising instructions stored in non-transitory memory that are executable by the controller to: operate in second gear with the DCC in an open mode while delivering torque from the input to the output via the friction clutch and the second gear ratio, wherein the DCC is in a completely disengaged state in the open mode, and wherein the friction clutch is in an engaged state in the second gear, and transition from operating in the second gear to operating in first gear, wherein the transition includes: transitioning the DCC from the open mode to a one-way clutch (OWC) mode, and then transitioning the DCC from the OWC mode to a locked mode. In a first example of the system, the DCC comprises a first locking element and a second locking element, and wherein transitioning the DCC from the open mode to the OWC mode includes adjusting the first locking element and the second locking element from both from being in a disengaged state, to the first locking element being in an engaged state and the second locking element being in the disengaged state. In a second example of the system, optionally including the first example, the friction clutch is hydraulically actuated, wherein the DCC is electromechanically actuated.

The disclosure also provides support for a transmission system for a vehicle, comprising: an input shaft configured to couple to a prime mover of the vehicle, a first gear set, a second gear set, a dynamic controllable clutch (DCC), a friction clutch, an output shaft, and a controller comprising instructions stored in non-transitory memory that are executable by the controller to: adjust a state of the DCC and a state of the friction clutch to selectively engage the first gear set and the second gear set for providing torque transfer from the input shaft to the output shaft. In a first example of the system, the controller further comprises instructions to: operate the vehicle with the DCC in a completely disengaged state while delivering torque from the input shaft to the output shaft via the friction clutch and the second gear set. In a second example of the system, optionally including the first example, the controller further comprises instructions to: during a downshift, transition the DCC from a completely disengaged state to a one-way clutch (OWC) state, and then transition the DCC from the OWC state to a fully engaged state, wherein the completely disengaged state, the OWC state, and the fully engaged state are discrete states of the DCC. In a third example of the system, optionally including one or both of the first and second examples, the controller further comprises instructions to: during an upshift, gradually apply the friction clutch, while disengaging the DCC, wherein the second gear set is transitional from a disengaged state to an engaged state via the application of the friction clutch. In a fourth example of the system, optionally including one or more or each of the first through third examples, the first gear set is a higher gear ratio than the second gear set. In a fifth example of the system, optionally including one or more or each of the first through fourth examples, the transmission system is a two speed transmission. In a sixth example of the system, optionally including, one or more or each of the first through fifth examples, the DCC is a selectable one-way clutch. In a seventh example of the system, optionally including one or more or each of the first through sixth examples, the state of the DCC is adjusted via actuation of one or more locking elements. In a eighth example of the system, optionally including one or more or each of the first through seventh examples, adjusting the state of the DCC includes activating one or more coils.

The disclosure also provides support for a transmission system for a vehicle, comprising: an input shaft configured to couple to a prime mover of the vehicle, a first gear set, a second gear set, a dynamic controllable clutch (DCC), a friction clutch, an output shaft, and a controller comprising instructions stored in non-transitory memory that are executable by the controller to: during a first condition, operate the DCC in a first mode wherein the DCC is in an engaged state and transfer torque from the input shaft to the output shaft via the first gear set and the DCC, while maintaining the friction clutch and the second gear set disengaged. The first mode may include the locked mode 452 or the OWC mode 454 discussed at FIG. 4C and FIG. 6, for example. In a first example of the system, the controller further comprises instructions to: during a second condition, gradually apply the friction clutch, while disengaging the DCC. In a second example of the system, optionally including the first example, the first gear set is a higher gear ratio than the second gear set. In a third example of the system, optionally including one or both of the first and second examples, the DCC is operable in a plurality of discrete states, and wherein the DCC is not gradually transitioned between the plurality of discrete states. In a fourth example of the system, optionally including one or more or each of the first through third examples, the controller further comprises instructions to: during a second condition, operate the friction clutch in an engaged state to transfer the torque from the input shaft to the output shaft via the second gear set and the friction clutch, wherein the DCC is completely disengaged during the second condition. In a fifth example of the system, optionally including, one or more or each of the first through fourth examples, the output shaft provides driving torque to one or more wheels of the vehicle. In a sixth example of the system, optionally including one or more or each of the first through fifth examples, the first gear set and the second gear set are constantly in mesh. In a seventh example of the system, optionally including one or more or each of the first through sixth examples, the controller further comprises instructions to: during a second condition, operate the friction clutch in an engaged state to transfer the torque from the input shaft to the output shaft via the second gear set and the friction clutch, wherein the DCC is completely disengaged during the second condition, and transition from the second condition to the first condition by gradually disengaging the friction clutch to gradually decrease an amount of the torque transferred from the input shaft to the output shaft via the friction clutch and the second gear set, while engaging the DCC.

The disclosure also provides support for a transmission system for a vehicle, comprising: an input shaft configured to couple to a prime mover of the vehicle, a first gear set, a second gear set, a dynamic controllable clutch (DCC), a friction clutch, an output shaft, and a controller comprising instructions stored in non-transitory memory that are executable by the controller to: operate in second gear with the DCC in a completely disengaged state while delivering torque from the input shaft to the output shaft via the friction clutch and the second gear set, wherein the friction clutch is in an engaged state in the second gear, and downshift from operating in the second gear to operating in first gear, wherein the downshift includes: transitioning the DCC from the completely disengaged state to a one-way clutch (OWC) state, and then transitioning the DCC from the OWC state to a fully engaged state, and gradually disengaging the friction clutch while transitioning the DCC from the completely disengaged state to the OWC state, and from the OWC state to the fully engaged state. In a first example of the system, the DCC comprises a first locking element and a second locking element, and wherein transitioning the DCC from the completely disengaged state to the OWC state includes adjusting the first locking element and the second locking element from both from being in a disengaged state, to the first locking element being in an engaged state and the second locking element being in the disengaged state. In a second example of the system, optionally including the first example, the friction clutch is hydraulically actuated, and wherein the DCC is electromechanically actuated.

Note that the example control and estimation routines included herein can be used with various electric machines and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein. As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system for a vehicle, comprising:
an input configured to couple to a prime mover of the vehicle;
a first gear ratio;
a second gear ratio;
a dynamic controllable clutch (DCC);
a friction clutch;
a transmission output; and
a controller comprising instructions stored in non-transitory memory that are executable by the controller to:
adjust a state of the DCC and a state of the friction clutch to selectively engage the first gear ratio and the second gear ratio for providing torque transfer from the input to the transmission output of the transmission system;
wherein the DCC and the friction clutch are the only clutches of the transmission system for the vehicle, and wherein adjusting the state of the DCC includes activating one or more coils;
wherein the DCC is a selectable one-way clutch that includes the one or more coils that are configured to independently cause a forward strut and a reverse strut to selectively engage and disengage an output of the DCC in different operating modes;
wherein the output in the DCC is coupled to a drive gear;
wherein the forward strut and the reverse strut are hingingly coupled to an input of the DCC;
wherein, during engagement of the forward strut, torque transfer from the input of the DCC to an output of the DCC occurs in a first rotational direction and is prevented in a second rotational direction; and
wherein, during engagement of the reverse strut, torque transfer from the input of the DCC to the output of the DCC occurs in the second rotational direction and is prevented in first rotational direction.

2. The transmission system of claim 1, wherein the controller further comprises instructions to:
operate the vehicle with the DCC in a completely disengaged state, wherein operating the vehicle with the DCC in the completely disengaged state comprises operating the vehicle with all locking elements of the DCC completely disengaged from the output of the DCC.

3. The transmission system of claim 1, wherein the controller further comprises instructions to:
transition the DCC from an open mode to a one-way clutch (OWC) mode, wherein the DCC is in a completely disengaged state in the open mode, and then
transition the DCC from the OWC mode to a locked mode,
wherein the open mode, the OWC mode, and the locked mode are discrete states of the DCC.

4. The transmission system of claim 1, wherein the second gear ratio is transitioned from a disengaged state to an engaged state via the friction clutch.

5. The transmission system of claim 1, wherein the first gear ratio is a higher gear ratio than the second gear ratio.

6. The transmission system of claim 1, wherein the transmission system is a two speed transmission.

7. The transmission system of claim 1, wherein a first spring pivotally biases the forward strut and a second spring pivotally biases the reverse strut.

8. The transmission system of claim 7, wherein the DCC is configured to selectively operate in an open mode, a one-way clutch mode, and a locked mode, wherein in the open mode the forward strut and the reverse strut are disengaged from the output, wherein in the one-way clutch mode the forward strut is engaged with the output and the reverse strut is disengaged from the output, and wherein in the locked mode both the forward strut and the reverse strut engage the output.

9. A transmission system for a vehicle, comprising:
an input configured to couple to a prime mover of the vehicle;
a first gear ratio;
a second gear ratio;
a dynamic controllable clutch (DCC);
a friction clutch;
a transmission output; and
a controller comprising instructions stored in non-transitory memory that are executable by the controller to:
during a first condition,
operate the DCC in a first mode in which the DCC is in an engaged state, and transfer torque from the input to the output via the DCC while maintaining the friction clutch disengaged;
wherein the DCC and the friction clutch are the only clutches of the transmission system for the vehicle, and wherein adjusting the state of the DCC includes activating one or more coils;
wherein the DCC is a selectable one-way clutch that includes the one or more coils that are configured to independently cause a forward strut and a reverse strut to selectively engage and disengage an output of the DCC in different operating modes;
wherein the output in the DCC is coupled to a drive gear;
wherein the forward strut and the reverse strut are hingingly coupled to an input of the DCC;
wherein, during engagement of the forward strut, torque transfer from an input of the DCC to an output of the DCC occurs in a first rotational direction and is prevented in a second rotational direction; and
wherein, during engagement of the reverse strut, torque transfer from the input of the DCC to the output of the DCC occurs in the second rotational direction and is prevented in first rotational direction.

10. The transmission system of claim 9, wherein the controller further comprises instructions to:
during a second condition,
gradually apply the friction clutch, while disengaging the DCC.

11. The transmission system of claim 9, wherein the first gear ratio is a higher gear ratio than the second gear ratio.

12. The transmission system of claim 9, wherein the DCC is operable in a plurality of discrete states, wherein the DCC is not gradually transitioned between the plurality of discrete states, wherein the DCC comprises a forward strut and a reverse strut, and wherein the forward strut and the reverse strut are electromechanically adjusted for transitioning between the plurality of discrete states.

13. The transmission system of claim 9, wherein the controller further comprises instructions to:
during a second condition,
operate the friction clutch in an engaged state to transfer the torque from the input to the output via the second gear ratio and the friction clutch, wherein the DCC is completely disengaged during the second condition.

14. The transmission system of claim 9, wherein the output provides driving torque to one or more wheels of the vehicle.

15. The transmission system of claim 9, wherein the first gear ratio and the second gear ratio are constantly in mesh.

16. The transmission system of claim 9, wherein the controller further comprises instructions to:
during a second condition,
operate the friction clutch in an engaged state to transfer the torque from the input to the output via the friction clutch, wherein the DCC is operated in a second mode during the second condition, and wherein the second mode of the DCC includes the DCC being disengaged during the second condition, and
transition from operating the DCC from the second mode to the first mode by gradually disengaging the friction clutch to gradually decrease an amount of the torque transferred from the input to the output via the friction clutch and the second gear ratio, while engaging the DCC.

17. A transmission system for a vehicle, comprising:
an input configured to couple to a prime mover of the vehicle;
a first gear ratio;
a second gear ratio;
a dynamic controllable clutch (DCC);
a friction clutch;
a transmission output; and
a controller comprising instructions stored in non-transitory memory that are executable by the controller to:
operate in second gear with the DCC in an open mode while delivering torque from the input to the output via the friction clutch and the second gear ratio, wherein the DCC is in a completely disengaged state in the open mode, and wherein the friction clutch is in an engaged state in the second gear, and
transition from operating in the second gear to operating in first gear, wherein the transition includes:

transitioning the DCC from the open mode to a one-way clutch (OWC) mode, and then transitioning the DCC from the OWC mode to a locked mode;

wherein the DCC and the friction clutch are the only clutches of the transmission system for the vehicle, and wherein adjusting the state of the DCC includes activating one or more coils;

wherein the DCC is a selectable one-way clutch that includes the one or more coils that are configured to independently cause a forward strut and a reverse strut to selectively engage and disengage an output of the DCC in different operating modes;

wherein the output in the DCC is coupled to a drive gear;

wherein the forward strut and the reverse strut are hingingly coupled to an input of the DCC;

wherein, during engagement of the forward strut, torque transfer from an input of the DCC to an output of the DCC occurs in a first rotational direction and is prevented in a second rotational direction; and wherein, during engagement of the reverse strut, torque transfer from the input of the DCC to the output of the DCC occurs in the second rotational direction and is prevented in first rotational direction.

18. The transmission system of claim 17, wherein the DCC comprises a first locking element and a second locking element, and wherein transitioning the DCC from the open mode to the OWC mode includes adjusting the first locking element and the second locking element from both from being in a disengaged state, to the first locking element being in an engaged state and the second locking element being in the disengaged state.

19. The transmission system of claim 17, wherein the friction clutch is hydraulically actuated, and wherein the DCC is electromechanically actuated via the activating of the one or more coils.

* * * * *